United States Patent
Takenaka et al.

(10) Patent No.: US 8,305,473 B2
(45) Date of Patent: Nov. 6, 2012

(54) DRIVING METHOD OF SOLID-STATE IMAGING APPARATUS, SOLID-STATE IMAGING APPARATUS, AND IMAGING SYSTEM

(75) Inventors: Shintaro Takenaka, Yokohama (JP); Kazuhiro Sonoda, Yokohama (JP); Masaru Fujimura, Sagamihara (JP); Tomoyuki Noda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 383 days.

(21) Appl. No.: 12/599,987

(22) PCT Filed: Jan. 29, 2009

(86) PCT No.: PCT/JP2009/051919
§ 371 (c)(1),
(2), (4) Date: Nov. 13, 2009

(87) PCT Pub. No.: WO2009/099116
PCT Pub. Date: Aug. 13, 2009

(65) Prior Publication Data
US 2011/0007173 A1    Jan. 13, 2011

(30) Foreign Application Priority Data
Feb. 6, 2008    (JP) ................... 2008-026541

(51) Int. Cl.
*H04N 5/335* (2011.01)
*H04N 5/228* (2006.01)
(52) U.S. Cl. ...... 348/300; 348/294; 348/296; 348/222.1

(58) Field of Classification Search .................. None
See application file for complete search history.

(56) References Cited

U.S. PATENT DOCUMENTS

| | | | |
|---|---|---|---|
| 6,960,751 B2 | 11/2005 | Hiyama et al. | 250/208.1 |
| 7,429,764 B2 | 9/2008 | Koizumi et al. | 257/292 |
| 7,561,199 B2 | 7/2009 | Noda et al. | 348/308 |
| 2005/0105836 A1 | 5/2005 | Gomi et al. | 384/302 |
| 2006/0243883 A1* | 11/2006 | Yahazu et al. | 250/208.1 |

(Continued)

FOREIGN PATENT DOCUMENTS
EP    1 549 050 A2    6/2005
(Continued)

OTHER PUBLICATIONS

J. Nakamura, "Image Sensors and Signal Processing for Digital Still Cameras," CRC Press, Taylor & Francis, Boca Raton, FL, pp. 158-160, 2006.

*Primary Examiner* — Lin Ye
*Assistant Examiner* — John H Morehead, III
(74) *Attorney, Agent, or Firm* — Fitzpatrick, Cella, Harper & Scinto

(57) ABSTRACT

In an amplifying type MOS sensor having a 3-transistor construction, when a frame rate is raised, an accumulation time of a frame just after the switching of a drive mode becomes short. When a gain correction is made to compensate a lack of accumulation time, a deterioration in picture quality is caused. A read out scan and a reset scan are executed in parallel in the frame before the switching of the drive mode, thereby preventing that a time period for resetting a pixel is overlapped with a time period for holding a pixel signal into a holding unit.

14 Claims, 17 Drawing Sheets

U.S. PATENT DOCUMENTS

| | | | |
|---|---|---|---|
| 2007/0052811 A1 | 3/2007 | Suzuki | 348/222.1 |
| 2007/0085921 A1 | 4/2007 | Kitagata et al. | 348/308 |
| 2007/0126886 A1 | 6/2007 | Sakurai et al. | 348/222.1 |
| 2007/0126902 A1* | 6/2007 | Kuroda | 348/296 |
| 2007/0258000 A1* | 11/2007 | Kondo | 348/308 |
| 2008/0002036 A1 | 1/2008 | Ohwa | 348/222.1 |
| 2008/0024634 A1 | 1/2008 | Takenaka | 348/307 |
| 2008/0062295 A1 | 3/2008 | Fujimura et al. | 348/301 |
| 2008/0062296 A1 | 3/2008 | Ogura et al. | 348/308 |
| 2008/0158403 A1 | 7/2008 | Itano et al. | 348/308 |
| 2008/0210994 A1* | 9/2008 | Kuwazawa | 257/292 |
| 2008/0225145 A1 | 9/2008 | Sonoda | 348/294 |
| 2008/0273093 A1 | 11/2008 | Okita et al. | 348/220.1 |
| 2008/0291290 A1 | 11/2008 | Sonoda et al. | 348/222.1 |
| 2009/0160988 A1* | 6/2009 | Yokota et al. | 348/302 |
| 2009/0219424 A1 | 9/2009 | Sonoda et al. | 348/302 |
| 2009/0225197 A1* | 9/2009 | Takahashi et al. | 348/240.2 |
| 2009/0256936 A1 | 10/2009 | Sonoda et al. | 348/294 |
| 2009/0256939 A1 | 10/2009 | Sonoda | 348/302 |
| 2009/0262210 A1 | 10/2009 | Sonoda | 348/222.1 |
| 2009/0273697 A1 | 11/2009 | Sonoda | 348/302 |
| 2011/0007173 A1* | 1/2011 | Takenaka et al. | 348/222.1 |

FOREIGN PATENT DOCUMENTS

| | | |
|---|---|---|
| JP | 2003-046864 A | 2/2003 |
| JP | 2007-074032 A | 3/2007 |
| JP | 2007-104241 A | 4/2007 |
| JP | 2008-016977 A | 1/2008 |

* cited by examiner

DRIVING METHOD OF SOLID-STATE IMAGING APPARATUS, SOLID-STATE IMAGING APPARATUS, AND IMAGING SYSTEM

TECHNICAL FIELD

The present invention relates to a solid-state imaging apparatus which is used in an electronic camera, an imaging system, and a driving method of the solid-state imaging apparatus.

BACKGROUND ART

An imaging apparatus called an amplifying type MOS sensor is used in an electronic video camera or an electronic still camera. In recent years, in association with the realization of advanced functions of those imaging apparatuses, an imaging apparatus having what is called an electronic zooming function for magnifying or reducing an image by outputting a signal only from a desired region in an imaging region has appeared.

As an imaging apparatus having the electronic zooming function, there is an imaging apparatus disclosed in Japanese Patent Application Laid-Open No. 2007-074032. It is an object of Japanese Patent Application Laid-Open No. 2007-074032 to prevent the occurrence of a difference of accumulation time and to keep quality of an output image even when an electronic zoom magnification is changed at the time of photographing a moving image, that is, even in the case where a drive mode of the imaging apparatus is switched.

A request for low costs of the imaging apparatus is strong and miniaturization of the imaging apparatus is demanded. As a technique for realizing the miniaturization of the imaging apparatus, there is an amplifying type MOS sensor having what is called a 3-transistor construction, disclosed in Japanese Patent Application Laid-Open No. 2003-046864, in order to assure an area of a photodiode by decreasing an area of a transistor which occupies per pixel.

In the amplifying type MOS sensor disclosed in Japanese Patent Application Laid-Open No. 2003-046864, having the 3-transistor construction which does not include a selection MOS transistor, an electric potential corresponding to the reset electric potential appears in a vertical output line when charges accumulated in a photodiode (PD) are reset. Therefore, timing for resetting the charges accumulated in the PD in a selection row by a reset scan (hereinbelow, reset row) and timing for reading out the charges accumulated in the PD in the selection row by a read out scan (hereinbelow, read out row) to an accumulation capacitor provided at the subsequent stage of the vertical output line cannot be performed concurrently.

In the imaging apparatus disclosed in Japanese Patent Application Laid-Open No. 2007-074032, since the scan of the read out row and the scan of the reset row are not overlapped, the electronic zoom magnification can be changed even in the amplifying type MOS sensor with the 3-transistor construction.

However, there is a case where it is required to variably change the accumulation time depending on a photographing condition such as luminance or the like of an object. For example, it is preferable to extend the accumulation time when the luminance of the object is low. However, in the imaging apparatus disclosed in Japanese Patent Application Laid-Open No. 2007-074032, since the scan of the reset row is started only after completion of the read out scan, a range where the accumulation time can be adjusted is limited. Further, when a frame rate rises, a time that is required until the start of the read out scan of the following frame after completion of the read out scan becomes short and an interval from the reset row scan to the read out scan, that is, a time which can be used as an accumulation time becomes short. There is, consequently, a risk of occurrence of such a situation that the necessary accumulation time cannot be assured. If a gain is corrected in order to compensate a lack of light amount that is caused due to the shortening of the accumulation time of the frame just after the drive mode is switched, a deterioration in picture quality is caused.

DISCLOSURE OF INVENTION

In consideration of the foregoing problems, in an amplifying type MOS sensor having a 3-transistor construction, it is an object of the present invention to improve a degree of freedom of an accumulation time even if a drive mode is switched.

According to a first aspect of the present invention, there is provided a driving method of a solid-state imaging apparatus comprising: a pixel region wherein pixels are arranged two dimensionally, the pixel comprising a photoelectric conversion element for accumulating an electric charge according to an incident light, a floating diffusion region for holding the electric charge, a transfer unit for transferring the electric charge accumulated in the photoelectric conversion element to the floating diffusion region, a reset unit for resetting the electric charge held in the floating diffusion region and an output unit for outputting a pixel signal according to a voltage in the floating diffusion region; and a holding unit for holding the pixel signal output from the output portion, wherein the method comprises steps of: in a first frame, conducting a read out scan, in a first drive mode, for selecting the pixel by controlling a potential of the floating diffusion region by a power source unit and the reset unit, and holding the pixel signal in the holding unit; and commencing, in a second frame following the first frame, the read out scan in a second drive mode different from the first drive mode, and wherein, a reset scan for resetting the electric charge accumulated in the photoelectric conversion element starts in the second drive mode in the first frame, so that the resetting operation of the electric charge accumulated in the photoelectric conversion element does not overlap with the holding operation of the pixel signal in the holding unit.

According to a second aspect of the present invention, there is provided a solid-state imaging apparatus comprising: a pixel region wherein pixels are arranged two dimensionally, the pixel comprising a photoelectric conversion element for accumulating an electric charge according to an incident light, a floating diffusion region for holding the electric charge, a transfer unit for transferring the electric charge accumulated in the photoelectric conversion element to the floating diffusion region, a reset unit for resetting the electric charge held in the floating diffusion region and an output unit for outputting a pixel signal according to a voltage in the floating diffusion region; a holding unit for holding the pixel signal output from the output portion; and in a first frame, conducting a read out scan, in a first drive mode, for selecting the pixel by controlling a potential of the floating diffusion region by a power source unit and the reset unit and holding the pixel signal in the holding unit, and commencing, in a second frame following the first frame, the read out scan in a second drive mode different from the first drive mode, and wherein, a reset scan for resetting the electric charge accumulated in the photoelectric conversion element starts in the second drive mode in the first frame, so that the resetting operation of the electric charge accumulated in the photoelectric conversion element does not overlap with the holding operation of the pixel signal in the holding unit.

According to the present invention, in the amplifying type MOS sensor having the 3-transistor construction, even if the drive mode is switched, the degree of freedom of the accumulation time can be improved.

Further features of the present invention will become apparent from the following description of exemplary embodiments with reference to the attached drawings.

BEST MODE FOR CARRYING OUT THE INVENTION

Embodiments regarding the present invention will be described hereinbelow with reference to the drawings.

First Embodiment

Figure 1:
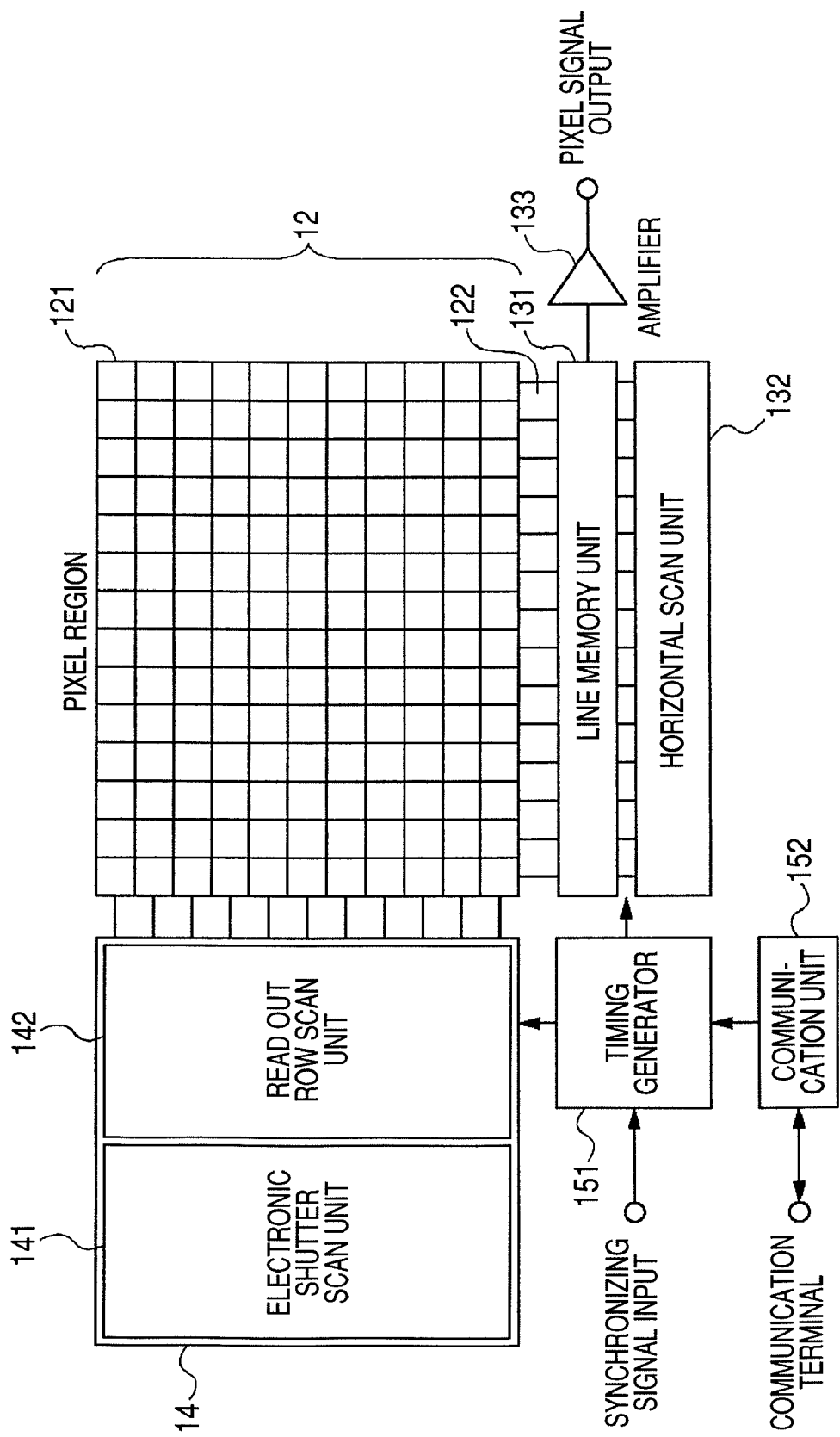
FIG. 1 is a block diagram illustrating a constructional example of a solid-state imaging apparatus according to an embodiment of the present invention.

FIG. 1 illustrates a constructional example of a solid-state imaging apparatus according to the first embodiment of the present invention. A solid-state imaging apparatus 1 has: a pixel region 12 having a plurality of pixels 121 arranged two dimensionally; and a vertical driver 14 for supplying a control signal to drive each pixel in the pixel region 12 to the pixel region 12. The solid-state imaging apparatus 1 further has: a line memory unit 131 as a holding unit connected to the pixels 121 through vertical output lines 122; a horizontal scan unit 132; an amplifier 133; a timing generator 151; and a communication unit 152. The vertical driver 14 includes an electronic shutter scan unit 141 and a read out row scan unit 142. The line memory unit 131 holds a signal output from each of the pixels of one row selected based on the control signal which is supplied from the vertical driver 14 to the pixel region 12. The signals held in the line memory unit 131 are sequentially amplified by the amplifier 133 by the horizontal scan unit 132 and are output. The timing generator 151 generates pulses for driving the vertical driver 14, line memory unit 131 and horizontal scan unit 132 based on a synchronizing signal, a signal which is input from the communication unit 152, and the like. It is assumed here that the timing generator 151 and the vertical driver 14 are a controlling unit. The timing generator 151 may be provided on a same substrate as that of the pixel region 12 or on a substrate different from that of the pixel region 12.

Figure 2:
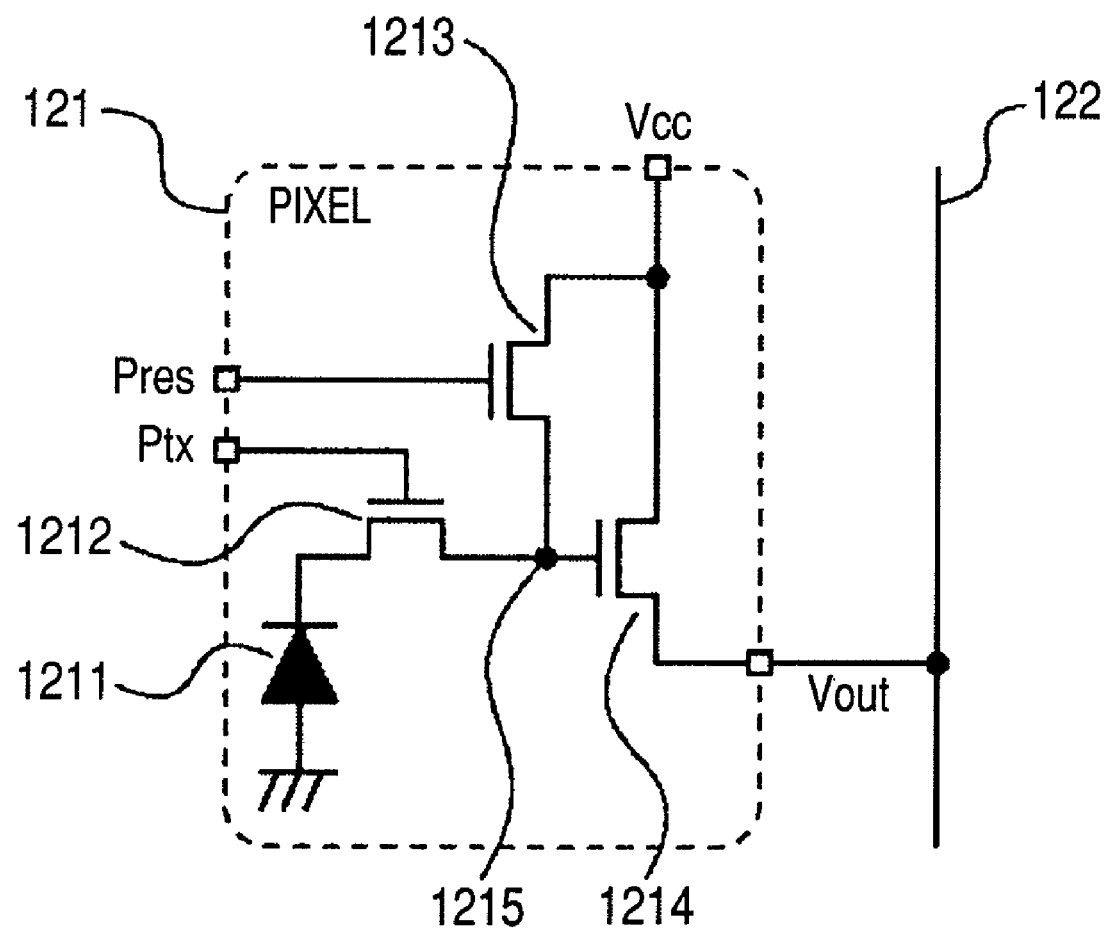
FIG. 2 is a circuit diagram illustrating a constructional example of a pixel according to the first embodiment of the present invention.

FIG. 2 is a circuit diagram illustrating a constructional example of the pixel 121. In FIG. 2, a photoelectric conversion element (photodiode portion, PD portion) 1211 executes a photoelectric conversion and accumulates electric charges according to incident light. A floating diffusion region (FD region) 1215 holds the electric charges transferred through a transfer MOS transistor 1212 as a transfer portion. A reset MOS transistor (reset portion) 1213 resets a voltage of the FD region 1215 to a predetermined voltage. An amplifying MOS transistor (output portion) 1214 outputs a signal according to an electric potential of the FD region 1215 from a Vout terminal to the vertical output lines 122. A drain of the reset MOS transistor 1213 and a drain of the amplifying MOS transistor 1214 are respectively connected to a power voltage Vcc which can change a voltage it supplies in a pulse form. A source of the amplifying MOS transistor 1214 forms a source follower circuit together with a current source (not shown), so that the amplifying MOS transistor 1214 can output the signal according to the electric potential of the FD region 1215 connected to a gate terminal.

Figure 3:
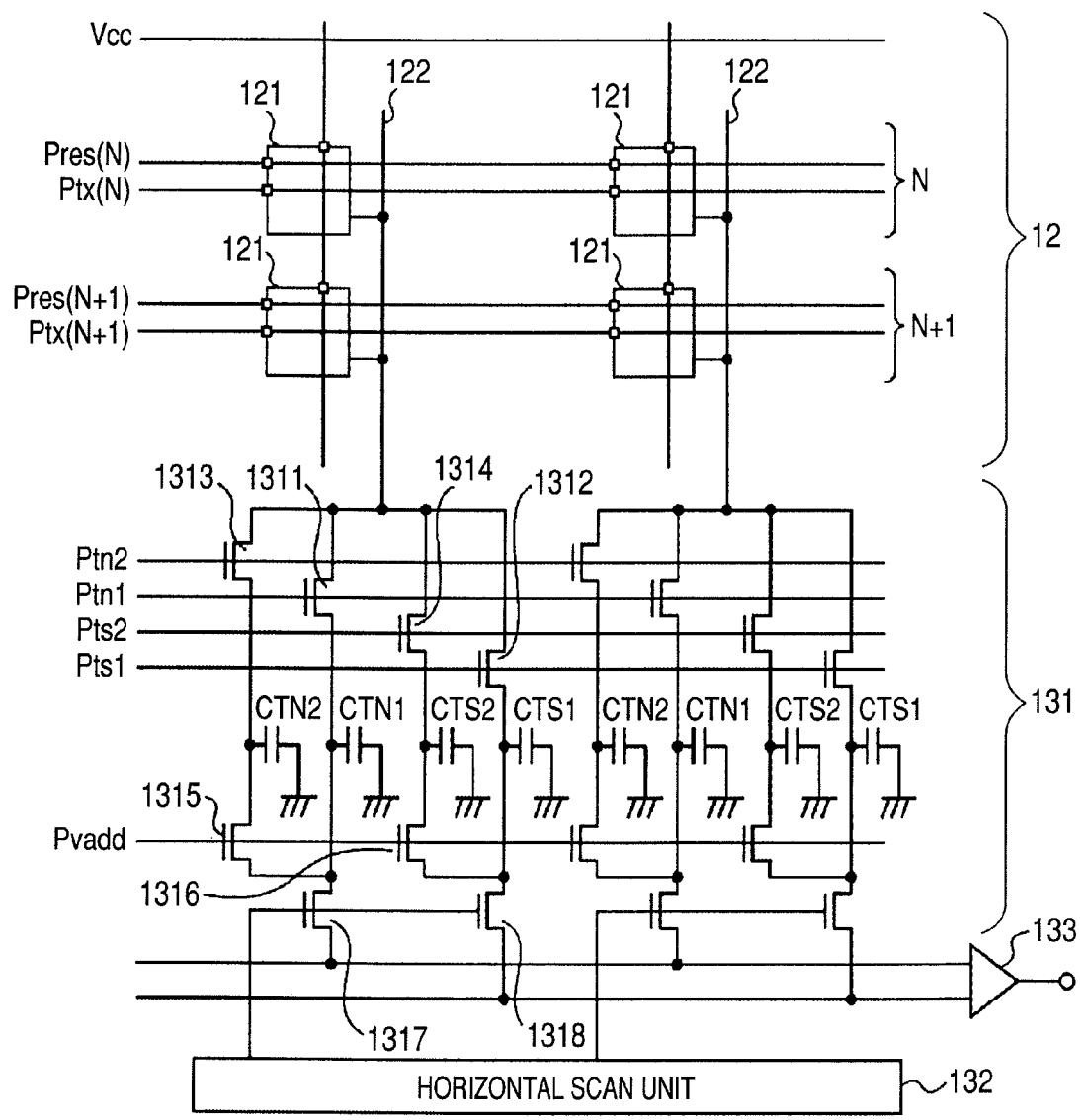
FIG. 3 is a circuit diagram illustrating a constructional example of a pixel region and a line memory unit according to the first embodiment of the present invention.

FIG. 3 is a circuit diagram illustrating a constructional example of the pixel region 12 and the line memory unit 131 in the case where the pixel 121 of FIG. 2 is applied as a construction of the pixel 121 in FIG. 1. By controlling conducting states of CT transfer switch MOS transistors 1311 to 1314, the pixel signals output to the vertical output lines 122 can be selectively held in capacitors CTS1, CTS2, CTN1 and CTN2 arranged at the subsequent stage. Addition switch MOS transistors 1315 and 1316 are controlled by a common signal Pvadd. When the addition switch MOS transistors 1315 and 1316 are made conductive by the Pvadd, the signals held in the capacitors CTN1, CTN2, CTS1 and CTS2 are added (averaged). When horizontal transfer switch MOS transistors 1317 and 1318 are made conductive by receiving the signals from the horizontal scan unit, the output unit 133 and the line memory unit 131 are made conductive and the signals are input to the output unit 133.

Figure 4:
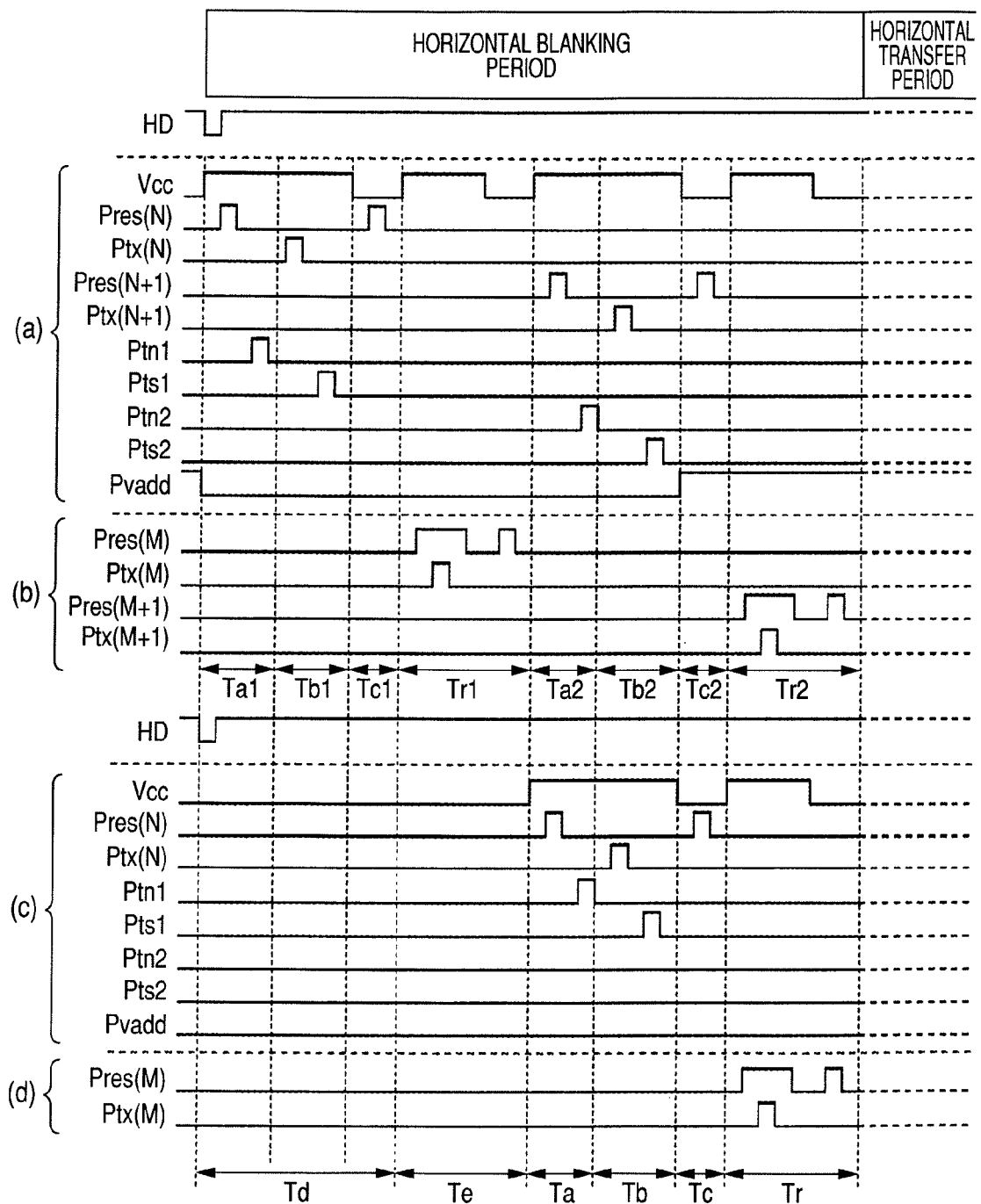
FIG. 4 is a timing chart showing drive timing for the pixel region and the line memory unit according to the first embodiment of the present invention.

FIG. 4 is a timing chart of pulses for driving the pixel region 12 and the line memory unit 131 in the circuit constructional example illustrated in FIG. 3. Although the pixels of only two rows×two columns are extracted and illustrated here for simplicity of illustration, the number of pixels is not limited to it.

A driving method of the pixel region 12 and the line memory unit 131 in the first embodiment will be described by using the timing chart of FIG. 4.

First, a read out scan and an electronic shutter scan, that is, a reset row scan in a two-row-addition drive mode for adding the signals from the pixels of two adjacent rows shown by the Nth row and the (N+1)th row will be described. In the electronic shutter scan, the PD portions included in at least the pixels of the row which is read out by the read out scan are reset. In the present invention, the operation to reset the PD portion is also called a PD reset. (a) in FIG. 4 is a timing chart for the read out operation in the two-row-addition drive mode. (b) in FIG. 4 is a timing chart for the electronic shutter operation.

When a horizontal synchronizing signal HD is input to the timing generator 151, the operation to select the Nth row is started by the read out row scan unit 142. When the reset MOS transistor 1213 is turned on, that is, when the reset MOS transistor 1213 is made conductive by setting a signal line Pres(N) to the High level after the power voltage Vcc is set to the High level, the electric potential of the FD region 1215 is initialized to the electric potential according to the electric potential of the High level of the power voltage Vcc. Thus, a selected state where the signals of the pixels of the Nth row appear on the vertical output line 122 is obtained. After that, by setting the signal line Pres(N) to the Low level, the reset MOS transistor 1213 is turned off, that is, the reset MOS transistor 1213 is made nonconductive. After that, by setting a signal line Ptn1 to the High level in a pulse form, the CT transfer switch MOS transistor 1311 is turned on, and the pixel signal corresponding to noise components as a pixel signal output to the vertical output line 122 is held in the capacitor CTN1. Thus, the read out operation of the pixel signal corresponding to the noise components of the pixels of the Nth row is completed (time period Ta1).

Subsequently, the transfer MOS transistor 1212 is turned on by setting a signal line Ptx(N) to the High level and the electric charges which have been generated and accumulated in the PD portion 1211 are transferred to the FD region 1215. After the transfer MOS transistor 1212 is turned off by setting the Ptx(N) to the Low level, the Pts1 is set to the High level in a pulse form. Therefore, the CT transfer switch MOS transistor 1312 is turned on and the pixel signal, to which the foregoing noise components have been multiplexed, which has been output to the vertical output line 122 is held in the capacitor CTS1. Consequently, the read out operation of the pixel signal of the Nth row is completed (time period Tb1). It is now assumed that the pixel signal denotes a signal appearing on the vertical output line 122 according to the electric charges held in the FD region of the pixel 121.

By setting the Pres(N) to the High level in a state where the power voltage Vcc has been set to the Low level, the reset MOS transistor 1213 is turned on and the pixels of the Nth row are set into a non-selected state (time period Tc1). The non-selected state denotes a state where the signal according to the electric potential of the FD region of the relevant pixel does not appear on the vertical output line 122. The Low level of the power voltage Vcc is such a level that the amplifying MOS transistor 1214 does not perform the follower operation together with a constant current source (not shown).

In the following time period, the operation to select the Mth row as an arbitrary row is executed by the electronic shutter scan unit 141. After the power voltage Vcc is set to the High level, when a signal line Ptx(M) is set to the High level in a state where a signal line Pres(M) has been set to the High level, the reset MOS transistor 1213 and the transfer MOS transistor 1212 of the pixels of the Mth row are turned on. Thus, the electric charges in the PD portion 1211 are swept out to a terminal adapted to supply the power voltage Vcc and the PD portion 1211 is set into an initial state (is reset). After turning off the transfer MOS transistor 1212 and the reset MOS transistor 1213 of the Mth row by respectively setting the Ptx(M) and Pres(M) to the Low level, the Pres(M) is set to the High level in a state where the power voltage Vcc has been set to the Low level. Thus, the pixels of the Mth row are set into the non-selected state and the PD reset of the Mth row is completed (time period Tr1). Since the operation to reset the pixel is substantially equivalent to an operation for selecting the pixel, when the pixel is reset, the electric potential corresponding to the potential of the FD when the PD has been reset appears on the vertical output line 122. Therefore, the read out operation cannot be performed for the time period Tr1.

Subsequent to the PD reset of the Mth row in the time period Tr1, the operation to select the (N+1)th row which is selected next to the Nth row is performed by the read out row scan unit 142. After the power voltage Vcc is set to the High level, when a signal line Pres(N+1) is set to the High level and the reset MOS transistor 1213 is turned on, the electric potential of the FD region 1215 is initialized to the electric potential according to the electric potential of the power voltage Vcc of the High level. Therefore, such a selected state where the signal of the pixels of the (N+1)th row appears on the vertical output line 122 is obtained. After that, by setting the Pres(N+1) to the Low level, the reset MOS transistor 1213 is turned off. A signal line Ptn2 is turned on in a pulse form and the pixel signal corresponding to the noise components output to the vertical output line 122 is held into the capacitor CTN2. Consequently, the read out operation of the pixel signal corresponding to the noise components of the pixels of the (N+1)th row is completed (time period Ta2).

Subsequently, the transfer MOS transistor 1212 is turned on by setting a signal line Ptx(N+1) to the High level and the electric charges which have been generated and accumulated in the PD portion 1211 are transferred to the FD region 1215. After the transfer MOS transistor 1212 is turned off by setting the signal line Ptx(N+1) to the Low level, a Pts2 is set to the High level in a pulse form, thereby turning on the CT transfer switch MOS transistor 1312. Thus, the pixel signal to which the foregoing noise components have been multiplexed is held in the capacitor CTS2 from the vertical output lines 122 and the read out operation of the pixel signal of the (N+1)th row is completed (time period Tb2).

When the reset MOS transistor 1213 is turned on by setting the Pres(N+1) to the High level in the state where the Vcc has been set to the Low level, the (N+1)th row is set into the non-selected state (time period Tc2).

Subsequently, in a time period Tr2, the operation to select the (M+1)th row is executed by the electronic shutter scan unit 141. After the power voltage Vcc is set to the High level, when a signal line Ptx(M+1) is further set to the High level in a state where a signal line Pres(M+1) has been set to the High level, the reset MOS transistor 1213 and the transfer MOS transistor 1212 of the (M+1)th row are turned on. Thus, the electric charges in the PD portion 1211 are swept out to the terminal adapted to supply the power voltage Vcc and the PD portion 1211 is set into the initial state (is reset). By respectively setting the Ptx(M+1) and Pres(M+1) to the Low level, the transfer MOS transistor 1212 and the reset MOS transistor 1213 of the (M+1)th row are turned off. After that, when the reset MOS transistor 1213 is turned on by setting the Pres(M+1) to the High level in the state where the power voltage Vcc has been set to the Low level, the (M+1)th row is set into the non-selected state and the PD reset of the (M+1)th row is completed (time period Tr2).

In the time period Tc2, by setting the signal Pvadd to the High level, the addition switch MOS transistors 1315 and 1316 are turned on. Thus, the pixel signal which has been held in the capacitor CTN1 and corresponds to the noise components of the Nth row and the pixel signal which has been held in the capacitor CTN2 and corresponds to the noise components of the (N+1)th row are respectively added. Similarly, the pixel signal which has been held in the capacitor CTS1 and to which the noise components of the Nth row have been multiplexed and the pixel signal which has been held in the capacitor CTS2 and to which the noise components of the (N+1)th row have been multiplexed are added. In this manner, the operation in a horizontal blanking period is completed.

In a horizontal transfer period subsequent to the horizontal blanking period, the horizontal scan unit 132 sequentially turns on the horizontal transfer switch MOS transistors 1317 and 1318. Thus, the signals held in the CTN1 and CTN2 and the signals held in the CTS1 and CTS2 are input to the differential amplifier 133. In the differential amplifier 133, by subtracting the noise components from the pixel signal to which the noise components have been multiplexed, the signal in which the noise components have been reduced is output.

In this manner, the read out operation of the pixel addition signal of the Nth row and the (N+1)th row and the PD reset of the Mth row and the (M+1)th row, that is, the electronic shutter operation are completed.

Subsequently, the read out operation and the electronic shutter operation in the non-addition drive mode will be described. (c) in FIG. 4 is a timing chart for the read out operation in the non-addition drive mode. (d) in FIG. 4 is a timing chart for the electronic shutter operation. In the non-addition drive mode, the read out operation is not executed for a time period Td corresponding to the time periods Ta1, Tb1, and Tc1 in the two-row-addition drive mode after the horizontal synchronizing signal HD is input to the timing generator 151. Similarly, the read out operation is not executed for a time period Te corresponding to the time period Tr1 in the two-row-addition drive mode. After the elapse of the time periods Td and Te, the read out operation is started.

First, the operation to select the Nth row is executed by the read out row scan unit 142. When the reset MOS transistor 1213 is turned on by setting the Pres(N) to the High level after the power voltage Vcc is set to the High level, the electric potential of the FD region 1215 is initialized to the electric potential of the High level of the power voltage Vcc. After that, by setting the Pres(N) to the Low level, the reset MOS transistor 1213 is turned off. By setting the Ptn1 to the High level in a pulse form, the CT transfer switch MOS transistor 1311 is turned on and the pixel signal corresponding to noise components as a pixel signal output to the vertical output line 122 is held in the capacitor CTN1. Thus, the read out operation of the pixel signal corresponding to noise components of the pixels of the Nth row is completed (time period Ta).

Subsequently, the transfer MOS transistor 1212 is turned on by setting the Ptx(N) to the High level and the electric charges which have been formed and accumulated in the PD portion 1211 are transferred to the FD region 1215. After the transfer MOS transistor 1212 is turned off by setting the Ptx(N) to the Low level, the Pts1 is set to the High level in a pulse form, thereby turning on the CT transfer switch MOS transistor 1312. Thus, the pixel signal which has been output to the vertical output line 122 and to which the noise components have been multiplexed is held in the capacitor CTS1 and the read out operation of the pixel signal of the Nth row is completed (time period Tb). By setting the Pres(N) to the High level in a state where the power voltage Vcc has been set to the Low level, the reset MOS transistor 1213 is turned on and the pixels of the Nth row are set into a non-selected state (time period Tc).

The electronic shutter operation is executed for a time period corresponding to the time period Tr2 in the two-row-addition drive mode. First, the Mth row is selected by the electronic shutter scan unit 141. When the Ptx(M) is further set to the High level in a state where the Pres(M) is set to the High level after the power voltage Vcc is set to the High level, the reset MOS transistor 1213 and the transfer MOS transistor 1212 of the Mth row are set into the ON state. Thus, the electric charges in the PD portion 1211 are swept out to the terminal adapted to supply the power voltage Vcc, and the PD portion 1211 is reset. By respectively setting the Ptx(M) and Pres(M) to the Low level, the transfer MOS transistor 1212 and the reset MOS transistor 1213 of the Mth row are turned off. Thereafter, by setting the Pres(M) to the High level in a state where the power voltage Vcc has been set to the Low level, the pixels of the Mth row are set into the non-selected state and the PD reset of the Mth row is completed (time period Tr).

In the horizontal transfer period subsequent to the horizontal blanking period, the horizontal scan unit 132 sequentially turns on the horizontal transfer switch MOS transistors 1317 and 1318, thereby inputting the signals in the CTN1 and CTS1 to the differential amplifier 133. In the differential amplifier 133, by subtracting the noise components from the pixel signal to which the noise components have been multiplexed, the signal in which the noise components have been reduced is output.

In this manner, the read out operation of the pixel signal of the Nth row and the PD reset of the Mth row, that is, the electronic shutter operation are completed. A length of the horizontal blanking period in the non-addition drive mode is the same as the horizontal blanking period in the two-row-addition drive mode mentioned above.

Figure 5A:
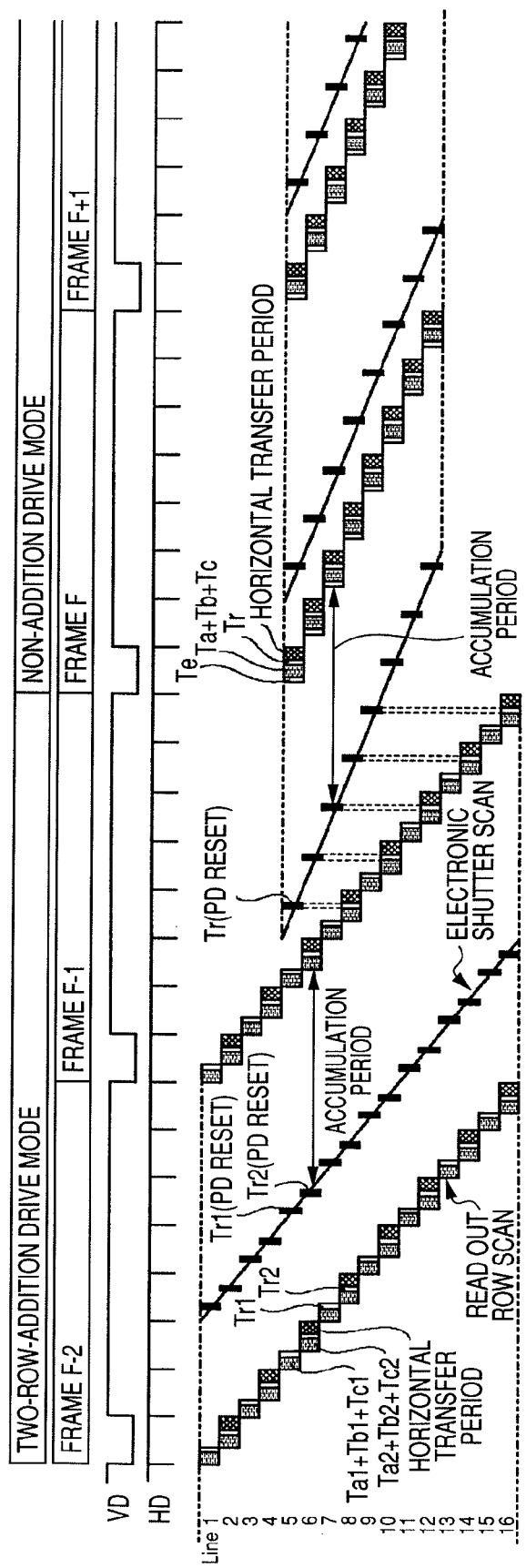
FIGS. 5A and 5B are timing charts showing drive timing for the solid-state imaging apparatus according to the first embodiment of the present invention.
Figure 5B:
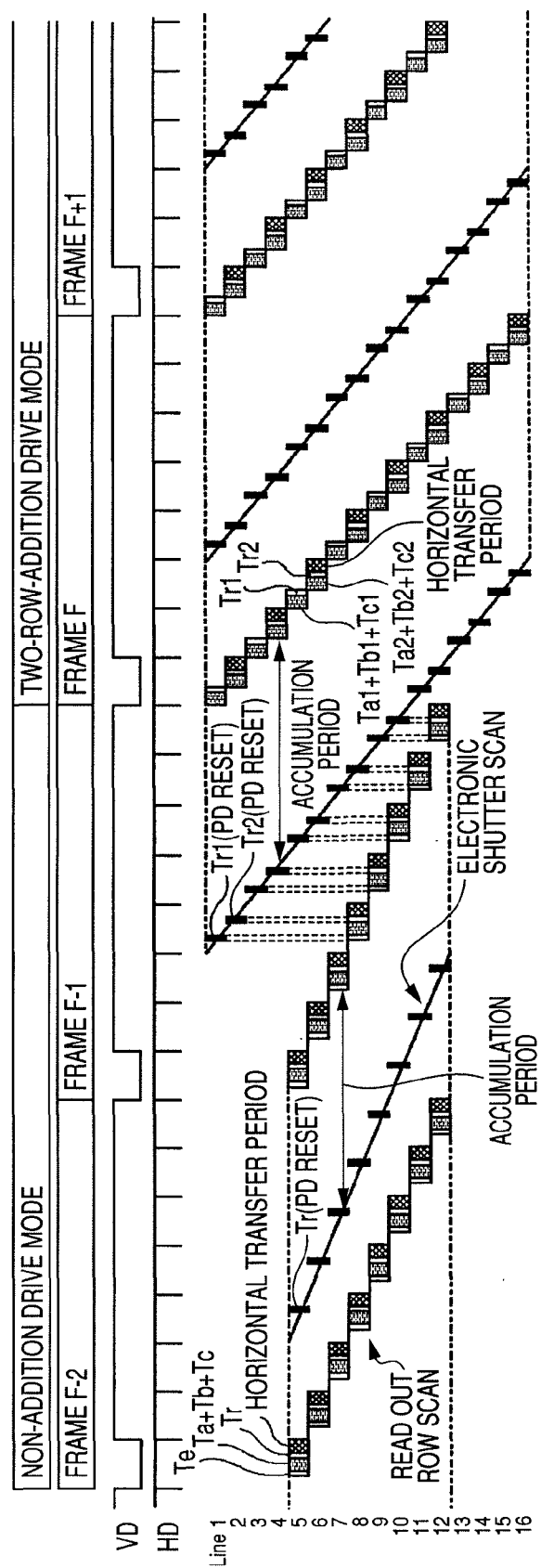

FIGS. 5A and 5B are timing charts showing a driving method of the solid-state imaging apparatus in this embodiment.

First, the driving method in the case of switching from the two-row-addition drive mode to the non-addition drive mode will be described with reference to FIG. 5A. In the description hereinafter, a "frame" denotes a time period after the timing when the vertical synchronizing signal VD has been input to the timing generator 151 until a next vertical synchronizing signal VD is input to the timing generator 151. In one frame, a signal necessary to form an image of one image plane is output from the solid-state imaging apparatus 1.

In FIG. 5A, when the horizontal synchronizing signal HD is input to the timing generator 151, the read out row scan and the electronic shutter scan are controlled and the image signal corresponding to one row of the image is read out for the 1HD time period (horizontal synchronization period) sandwiched between the consecutive horizontal synchronizing signals HD. In the case of the two-row-addition drive mode, with respect to the read out row scan, since the pixels of two rows are scanned for the 1HD time period, the signals from the pixels of the two rows are added in the line memory unit 131 and the image signal of one row is read out. Also with respect to the electronic shutter scan which is executed prior to the read out scan, the pixels of two rows are scanned for the 1HD time period. A time length after the PD reset of each row until the electric charges accumulated in the PD portion are transferred to the FD region, that is, the accumulation time is constant through one frame.

In the case of the non-addition drive mode, since the pixels of one row are scanned for the 1HD time period in each of the read out row scan and the electronic shutter scan which is executed prior to the read out scan, the accumulation time of each row is constant through one frame.

It is now assumed that a switching request to the non-addition drive mode is generated for a time period of a frame F-2 in which the read out operation is being executed in the two-row-addition drive mode as a first drive mode. The switching request of the drive mode is generated, for example, by operating a switch unit, which will be described hereinafter, and in response to such a request, the timing generator 151 supplies a pulse for driving the solid-state imaging apparatus. When the switching request of the drive mode is generated, in a frame F-1 as a first frame, the read out row scan is subsequently executed in the two-row-addition drive mode.

The electronic shutter scan is operated in the non-addition drive mode as a second drive mode from the frame F-1 prior to a frame F as a second frame. From the frame F, the read out row scan is also operated in the non-addition drive mode. By equalizing the 1HD time periods before and after the switching of the drive mode, even in the frame just after the switching of the drive mode, the accumulation time of each row before and after the switching of the drive mode is equal.

In the electronic shutter scan which is started in the frame F-1, the Tr time period as PD portion reset timing is necessarily overlapped with the Tr2 time period as a horizontal blanking period in the read out row scan in the two-row-addition drive mode. Therefore, even if the read out row scan in the two-row-addition drive mode and the electronic shutter scan in the non-addition drive mode are executed in parallel, the image signal of the frame F-1 does not become invalid as long as the electronic shutter scan does not get ahead of the read out row scan. Such a situation that the accumulation time of the frame F does not become constant is eliminated.

How the image signal becomes invalid will now be described in more detail. A state where the electronic shutter scan gets ahead of the read out row scan denotes that, in FIG. 5A, a straight line showing the electronic shutter scan intersects the read out row scan. That is, if the electronic shutter scan got ahead of the read out row scan, in a part of the read out scan of the frame, the PD reset is executed before the pixel signal is held in the line memory unit. Therefore, a portion in which the timing and length of the accumulation time differ is caused in one frame and such phenomenon is called "the image signal becomes invalid". To avoid the image signal from becoming invalid, it is constructed in such a manner that the electronic shutter scan and the read out row scan do not intersect.

According to the first embodiment, since the read out row scan and the electronic shutter scan of the different drive modes can be simultaneously executed in the frame F-1, the accumulation time of the frame F just after the switching of the drive mode can be extended. Although 1VD time periods before and after the switching of the drive mode are constant in FIG. 5A, the 1VD time period may be different, that is, the number of read out rows may be changed depending on the drive mode.

Subsequently, the driving method in the case of switching from the non-addition drive mode to the two-row-addition drive mode will be described with reference to FIG. 5B.

First, it is now assumed that a switching request to the two-row-addition drive mode is generated for the time period of the frame F-2 in which the read out operation is being executed in the non-addition drive mode as a first drive mode. Thus, the read out row scan is subsequently executed in the non-addition drive mode in the frame F-1 as a first frame. The electronic shutter scan is operated from the frame F-1 in the two-row-addition drive mode as a second drive mode prior to the frame F. From the frame F as a second frame, the read out row scan is also operated in the two-row-addition drive mode. By equalizing the 1HD time periods before and after the switching of the drive mode, even in the frame just after the switching to the two-row-addition drive mode, the accumulation time of each row is equalized.

In the electronic shutter scan which is started in the frame F-1, the Tr1 time period as timing for resetting the PD portion is necessarily overlapped with the Te time period as a horizontal blanking period in the read out row scan in the non-addition drive mode and the Tr2 time period is necessarily overlapped with the Tr time period. Therefore, even if the read out row scan in the non-addition drive mode and the electronic shutter scan in the two-row-addition drive mode are executed in parallel, the image signal of the frame F-1 does not become invalid as long as the electronic shutter scan does not get ahead of the read out row scan in the frame F-1. Such a situation that the accumulation time of the frame F does not become constant is eliminated. Since the read out row scan and the electronic shutter scan in the different drive modes can be executed in parallel, the accumulation time of the frame F-1 just after the switching of the drive mode can be extended.

According to the first embodiment, even if the read out row scan and the electronic shutter scan in the different drive modes are executed in the frame just before the switching of the drive mode, the PD reset time period in the electronic shutter scan is not overlapped with the signal read out time period from the vertical output lines in the read out row scan. Therefore, even in the amplifying type MOS sensor with the 3-transistor construction, in the frame just before the switching of the drive mode, the reset row scan of the following frame can be started during the read out row scan. That is, even when a frame rate is raised, the accumulation time of the frame just after the switching of the drive mode can be extended and the deterioration in image in electronic zooming can be prevented.

Although the description of the first embodiment has been made with respect to the example in which the two-row-addition drive mode and the non-addition drive mode are used as drive modes, the number of rows to be added for the one horizontal blanking period is not limited. Although the example in which the signals of the pixels are added by using the capacitors of the line memory has been shown above, it does not limit the first embodiment of the present invention. For example, the outputs from the vertical output lines may be connected to the line memory through a noise cancelling circuit and the addition may be performed in the noise cancelling circuit. Further, the present invention can be also applied to such a scan that the rows are skipped within the one horizontal blanking period, that is, to the case where the pixels are thinned out and the signals are read out of a partial region in the pixel region. That is, by making the horizontal blanking periods constant in the different drive modes and by further executing the PD reset for a time period during which the read out of the signals from the vertical output lines is not executed, an effect similar to that in the first embodiment can be obtained. In a solid-state imaging apparatus which comprises light-shielded pixels for a correcting process and pixels which do not have the photoelectric conversion elements are held in the pixel region along with effective pixels regarding the creation of the image, the partial region in the pixel region can also indicate the whole of the effective pixels.

In FIG. 4, although the operation for driving the pixels is not executed in the time periods Td and Te in the non-addition drive mode, the time period Ta to Tr and the time period corresponding to the time periods Td and Te may be exchanged. In such a case, the time period Tr in the non-addition drive mode is overlapped with the time period Tr1 in the two-row-addition drive mode. Therefore, even in the amplifying type MOS sensor with the 3-transistor construction, in the frame just before the switching of the drive mode, the reset row scan of the following frame can be started during the read out row scan. However, if the time period Ta to Tr and the time period corresponding to the time periods Td and Te were exchanged, a time interval until the horizontal transfer period after the pixel signal is held in the line memory unit becomes long. In such a case, since a possibility that the electric charges held in the capacitors leak or it is influenced by disturbance noises increases, a deterioration in quality of the obtained image is considered. Therefore, the driving in which the time interval after the pixel signal is held in the line memory unit and until the horizontal transfer period is shorter, as illustrated in FIG. 4, is desirable.

In the first embodiment, the lengths of the one horizontal blanking period before and after the switching of the drive mode are equalized. The time after the horizontal synchronizing signal HD is input to the timing generator 151 and until the reset scan is performed and the time after the horizontal synchronizing signal HD is input to the timing generator 151 and until the pixel signal is held in the capacitors in the line memory unit 131 differ. Therefore, the reset scan can be performed in parallel with the read out scan in the frame F-1.

Second Embodiment

Subsequently, the second embodiment to which the present invention can be applied will be described mainly with respect to a point different from the first embodiment.

Figure 6:
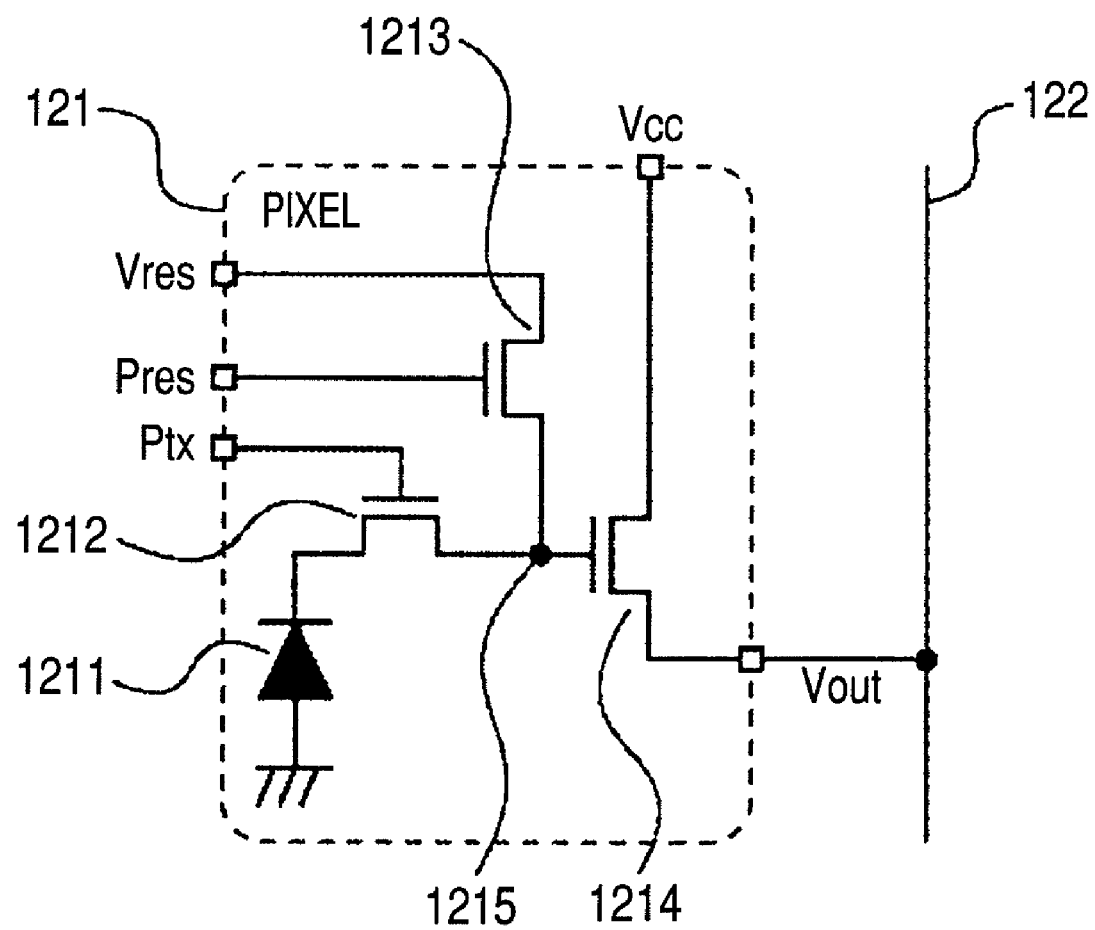
FIG. 6 is a circuit diagram illustrating a constructional example of a pixel of a solid-state imaging apparatus according to the second embodiment of the present invention.
Figure 7:
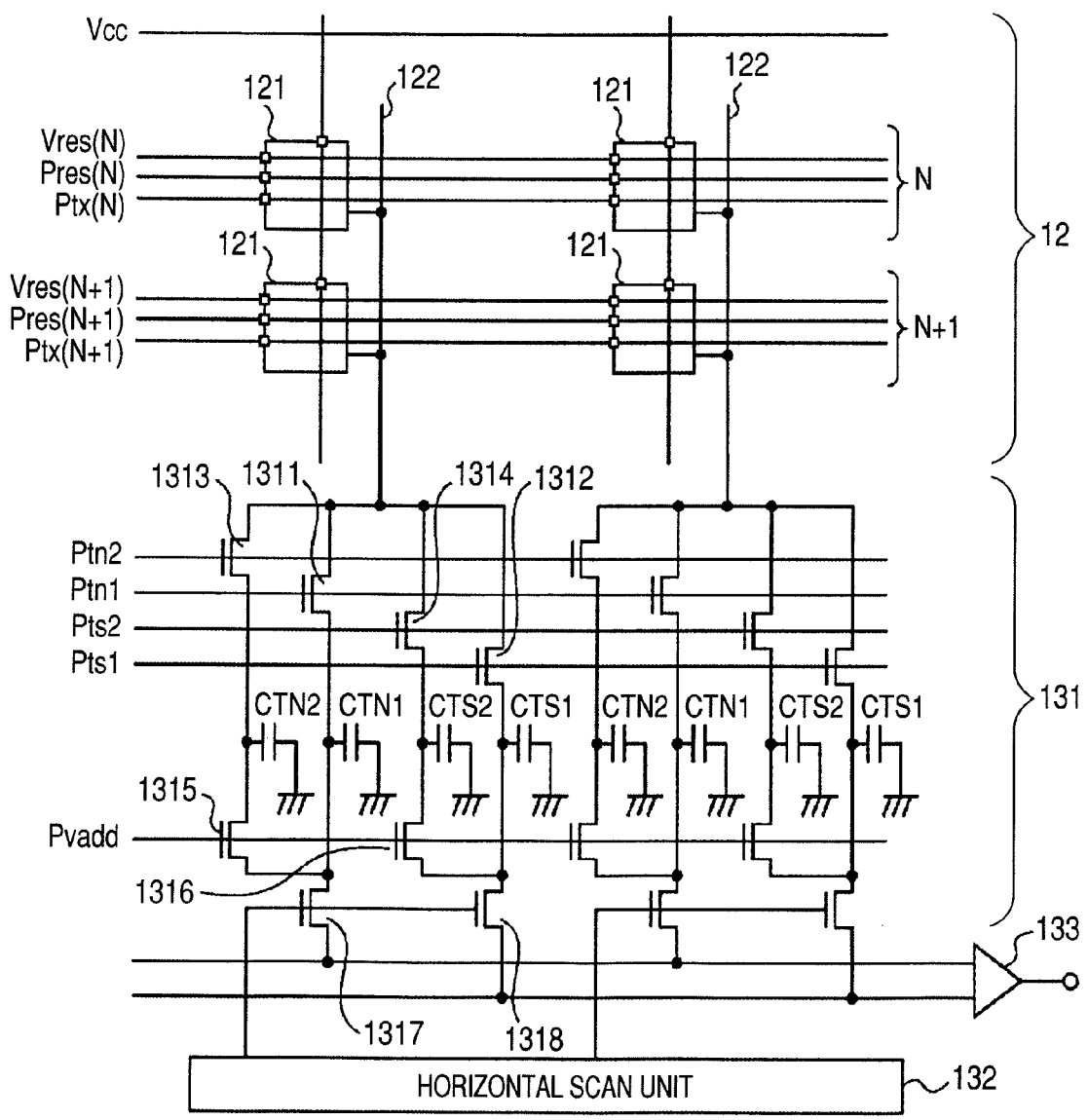
FIG. 7 is a circuit diagram illustrating a constructional example of a pixel region and a line memory unit according to the second embodiment of the present invention.
Figure 8:
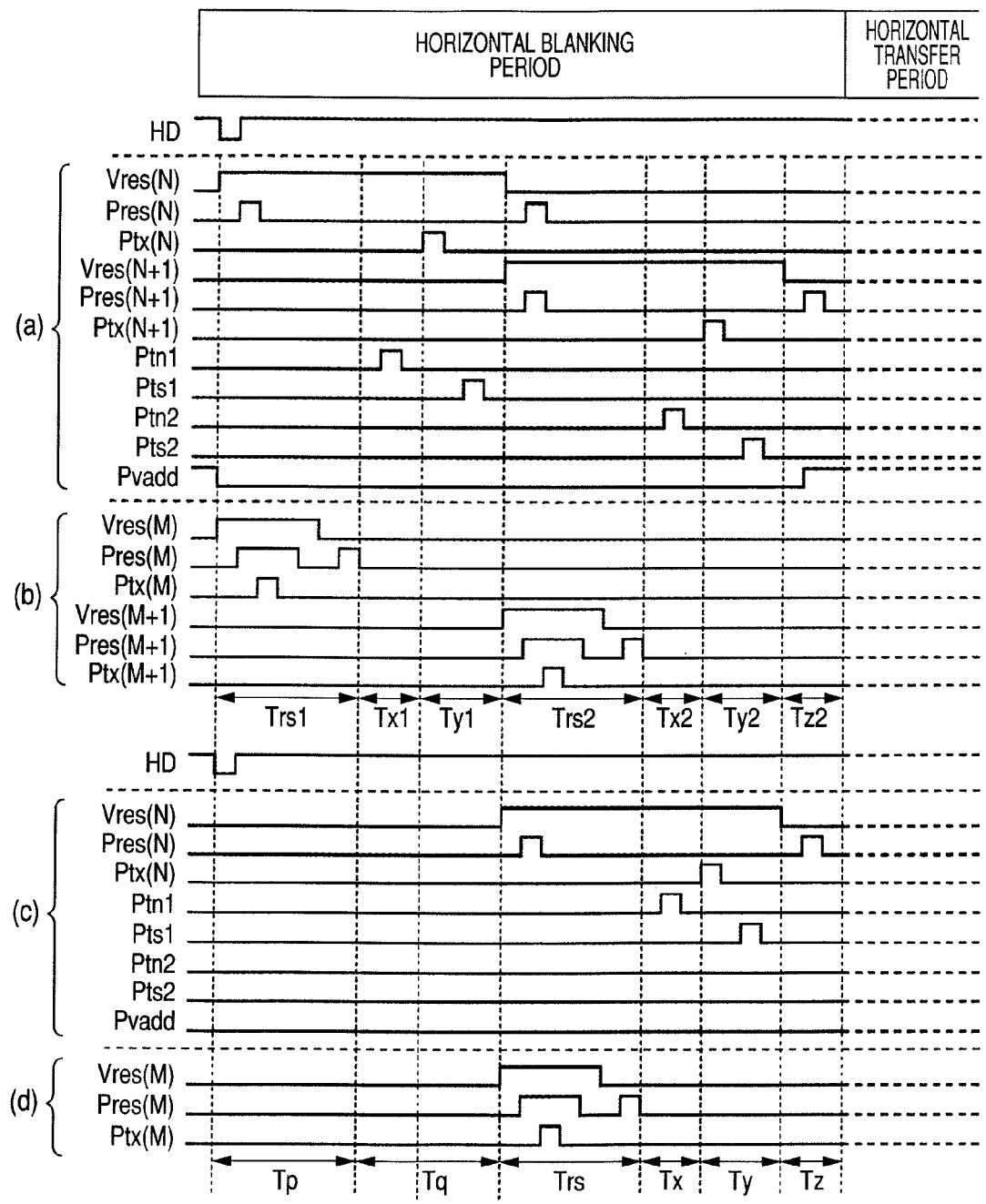
FIG. 8 is a timing chart showing drive timing for the pixel region and the line memory unit according to the second embodiment of the present invention.

A constructional example of a pixel of the solid-state imaging apparatus 1 according to the second embodiment is illustrated in FIG. 6. A constructional example of the pixel region 12 and the line memory unit 131 is illustrated in FIG. 7. It differs from FIG. 3 in that there is a line of Vres(N). A timing chart of the pulses for driving the pixel region 12 and the line memory unit 131 illustrated in FIG. 7 is illustrated in FIG. 8. Constructions common to those in the first embodiment are designated by the same reference numerals. Although the pixels of only two rows X two columns are extracted and illustrated here for simplicity of illustration, the number of pixels is not limited to it.

In FIG. 6, the drain of the reset MOS transistor 1213 is connected to a power voltage Vres which can be pulse-driven independently every row. In FIG. 7, Vres(N) drives the power voltages Vres of all of the pixels 121 arranged on the Nth row. In the constructional example of the solid-state imaging apparatus in the second embodiment, the selecting operation and the non-selecting operation in the read-out scan and the PD reset of the electronic shutter row can be executed in parallel.

Subsequently, the driving method of the pixel region 12 and the line memory unit 131 in the second embodiment will be described with reference to the timing chart of FIG. 8.

First, the read out scan and the electronic shutter scan in the two-row-addition drive mode of the Nth row and the (N+1)th row will be described. (a) in FIG. 8 is the timing chart for the read out operation in the pixel addition drive mode and (b) in FIG. 8 is the timing chart for the electronic shutter operation.

When the horizontal synchronizing signal HD is input to the timing generator 151, the operation to select the Nth row is executed by the read out row scan unit 142. When the reset MOS transistor 1213 is turned on by setting the Pres(N) to the High level after the power voltage Vres(N) is set to the High level, the electric potential of the FD region 1215 is initialized to the electric potential according to the electric potential of the Vres(N) and a state where the Nth row has been selected is obtained. Vcc as a power source which is common to all of the pixels 121 in the pixel region 12 may be always held at the High level. In the same time period, the PD reset is executed by setting the Ptx(M) to the High level in a state where a Vres(M) and a Pres(M) of the Mth row as an arbitrary row have been set to the High level by the electronic shutter scan unit 141. Only the Mth row is set into the non-selected state by setting the Pres(M) to the High level again after the Vres(M) is set to the Low level. The row selecting operation of the Nth row and the PD reset of the Mth row are completed (time period Trs1).

Subsequently, in a time period Tx1, the pixel signal corresponding to the noise components of the pixels of the Nth row is read out to the capacitor CTN1. In a time period Ty1, the pixel signal to which the noise components have been multiplexed is read out to the capacitor CTS1. The read out operation of the pixel signal of the Nth row is completed.

Subsequently, the Nth row is set into the non-selected state by setting the Pres(N) to the High level again after the Vres(N) is set to the Low level. In this time period, the (N+1)th row is selected by setting the Pres(N+1) to the High level after a Vres(N+1) is set to the High level. Further, the PD reset is executed by setting the Ptx(M+1) to the High level in a state where a Vres(M+1) and the Pres(M+1) of the (M+1)th row were been set to the High level. After that, the Vres(M+1) is returned to the Low level and the Pres(M+1) is set to the High level again. Thus, the (M+1)th row is set into the non-selected state and the PD reset of the (M+1)th row, the non-selected operation of the Nth row, and the selecting operation of the (N+1)th row are completed (time period Trs2).

Subsequently, in a time period Tx2, the signal corresponding to the noise components of the pixels of the (N+1)th row is read out to the capacitor CTN2. In a time period Ty2, the pixel signal to which the noise components have been multiplexed is read out to the capacitor CTS2.

After that, in a time period Tz2, the (N+1)th row is set into the non-selected state by setting the Pres(N+1) to the High level again in a state where the Vres(N+1) is set to the Low level. At the same time, the Pvadd is set to the High level and the noise components held in the capacitors CTN1 and CTN2 and the pixel signals in the capacitors CTS1 and CTS2 are added, respectively. In this manner, the horizontal blanking period in the addition read out of the Nth row and the (N+1)th row and the electronic shutter operation of the Mth row and the (M+1)th row is completed.

Next, the read out operation and the electronic shutter operation, that is, the photodiode reset operation in the non-addition drive mode will be described. (c) in FIG. 8 is a timing chart for the read out operation in the non-addition drive mode and (d) in FIG. 8 is the timing chart for the electronic shutter operation.

The read out operation is not executed for a time period Tp corresponding to the time period Trs1 in the two-row-addition drive mode after the horizontal synchronizing signal HD is input to the timing generator 151. Similarly, the read out operation is not executed for a time period Tq corresponding to the time periods Tx1 and Ty1. After the elapse of the time periods Tp and Tq, the read out operation is executed.

First, the selecting operation of the Nth row is executed by the read out row scan unit 142. When the reset MOS transistor 1213 is turned on by setting the Pres(N) to the High level after the Vres(N) is set to the High level, the electric potential of the FD region 1215 is initialized to the electric potential according to the electric potential of the power voltage Vres(N) and the Nth row is selected. At the same time, the PD reset is executed by setting the Ptx(M) to the High level in the state where the Vres(M) and Pres(M) of the Mth row have been set to the High level by the electronic shutter scan unit 141. Only the Mth row is set into the non-selected state by setting the Pres(M) to the High level again after the Vres(M) is set to the Low level. The row selecting operation of the Nth row and the PD reset of the Mth row are completed (time period Trs).

Subsequently, in the time period Tx, the pixel signal corresponding to the noise components of the pixels of the Nth row is read out to the capacitor CTN1. In the time period Ty, the pixel signal to which the noise components have been multiplexed is read out to the capacitor CTS1. The read out operation of the pixel signal of the Nth row is completed.

Subsequently, in the time period Tz, the Nth row is set into the non-selected state by setting the Pres(N) to the High level again after the Vres(N) is set to the Low level. In this manner, the read out operation of the Nth row in the non-addition drive mode and the horizontal blanking period of the electronic shutter operation of the Mth row are completed. The length of the horizontal blanking period in the non-addition drive mode is the same as the horizontal blanking period in the two-row-addition drive mode mentioned above.

Figure 9A:
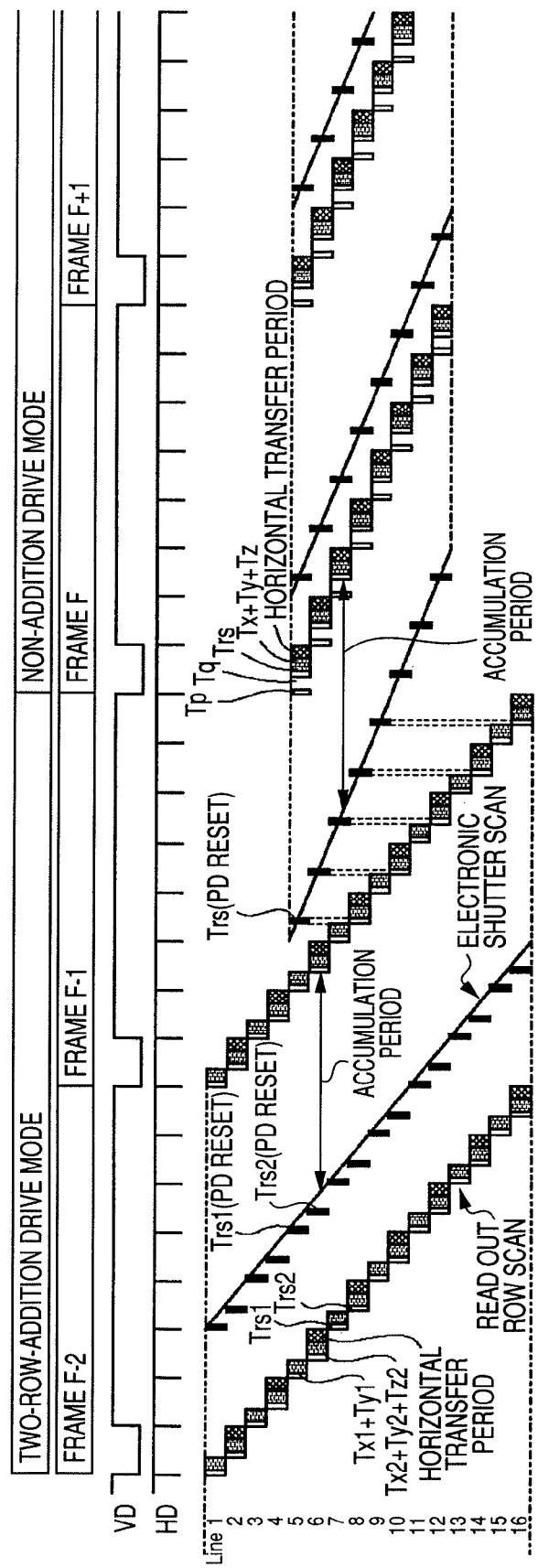
FIGS. 9A and 9B are timing charts showing drive timing for the solid-state imaging apparatus according to the second embodiment of the present invention.
Figure 9B:
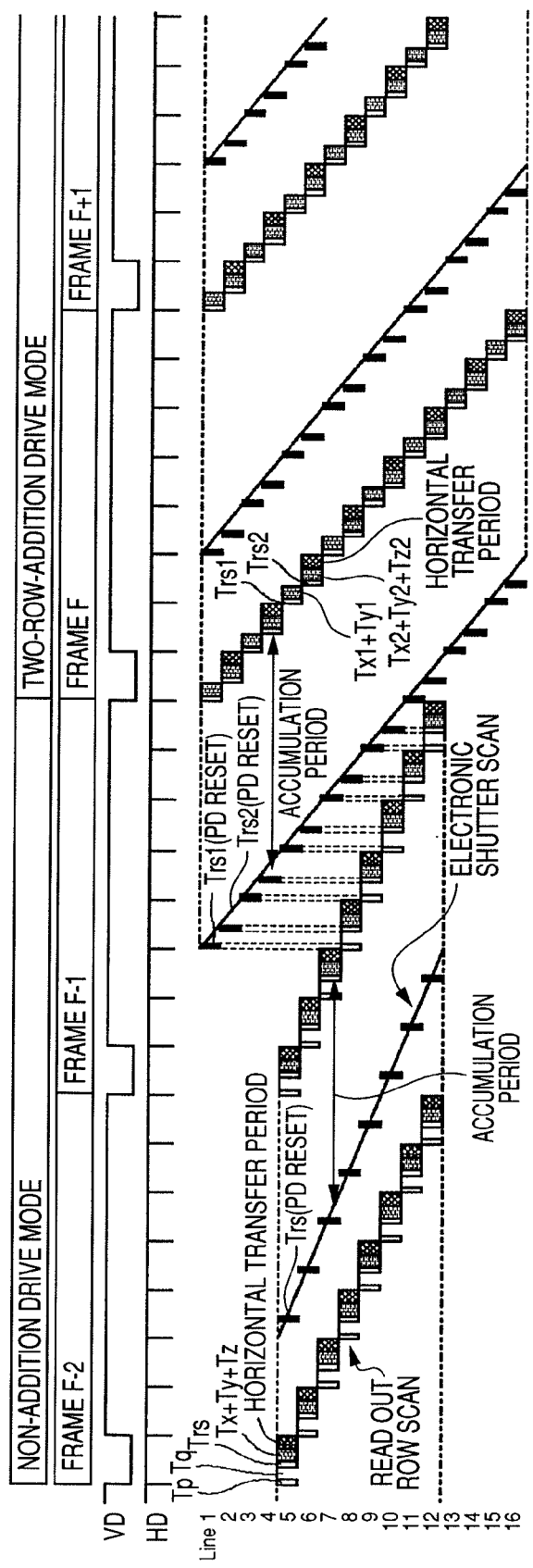

FIGS. 9A and 9B are timing charts illustrating the driving method of the solid-state imaging apparatus in the second embodiment. FIG. 9A illustrates the driving method in the case of switching from the two-row-addition drive mode to the non-addition drive mode. FIG. 9B illustrates the driving method in the case of switching from the non-addition drive mode to the two-row-addition drive mode.

In FIG. 9A, in the frame F-1 as a first frame which is a frame just before the drive mode is switched, the read out row scan in the two-row-addition drive mode as a first drive mode is executed. Further, in the frame F-1, the electronic shutter operation in the non-addition drive mode as a second drive mode is executed in parallel. At this time, the PD reset time period Trs in the non-addition drive mode is overlapped with the time period Trs2 in the two-row-addition drive mode.

In FIG. 9B, in the frame F-1 serving as a frame just before the drive mode is switched, the read out row scan in the non-addition drive mode as a first drive mode and the electronic shutter operation in the two-row-addition drive mode as a second drive mode are executed in parallel. At this time, the PD reset time periods Trs1 and Trs2 in the two-row-addition drive mode are overlapped with the time periods Tp and Trs in the non-addition drive mode, respectively.

According to the second embodiment, even if the read out row scan and the electronic shutter scan in the different drive modes are executed in the frame just before the switching of the drive mode, the PD reset time period in the electronic shutter scan is not overlapped with the signal read out time period from the vertical output lines in the read out row scan. Therefore, even in the solid-state imaging apparatus having such a construction that the drains of the reset MOS transistors can be pulse-driven independently every row, in the frame just before the switching of the drive mode, the reset row scan of the following frame can be started during the read out row scan. That is, even when the frame rate is raised, a degree of freedom of the timing when the accumulation time of the frame just after the switching of the drive mode can be set can be improved. The picture quality in the electronic zooming mode can be improved. Further, in the second embodiment, since the selecting operation and the PD reset are executed in the same time period, it is unnecessary to provide the time period only for the PD reset such as time periods Tr1 and Tr2 in the first embodiment. Thus, the horizontal blanking period can be shortened.

Although the example in which the two-row-addition drive mode and the non-addition drive mode are used as drive modes has been described in a manner similar to the description of the first embodiment of the present invention, the number of rows to be added for the one horizontal blanking period is not limited. Although the example in which the signals of the pixels are added by using the capacitors of the line memory has been shown above, it does not limit the embodiment of the present invention. For example, the outputs from the vertical output lines may be connected to the line memory through the noise cancelling circuit and the addition may be performed in the noise cancelling circuit. Further, the present invention can be also applied to such a scan that the rows are skipped within the one horizontal blanking period, that is, to the case where the pixels are thinned out and the signals are read out of a partial region in the pixel region. That is, by making the horizontal blanking periods constant in the different drive modes and by further executing the PD reset for a time period during which the read out of the signals from the vertical output lines is not executed, an effect similar to that in the second embodiment can be obtained. In the solid-state imaging apparatus which comprises light-shielded pixels for a correcting process and pixels which do not have the photoelectric conversion elements are held in the pixel region along with the effective pixels regarding the creation of the image, the partial region in the pixel region can also indicate the whole of the effective pixels.

In FIG. 8, although the operation for driving the pixels is not executed in the time periods Tp and Tq in the non-addition drive mode, the time period Trs to Tz and the time period corresponding to the time periods Tp and Tq may be exchanged. In such a case, the time period Trs in the non-addition drive mode are overlapped with the time period Trs1 in the two-row-addition drive mode. Therefore, even in the amplifying type MOS sensor with the 3-transistor construction, in the frame just before the switching of the drive mode, the reset row scan of the following frame can be started during the read out row scan. However, if the time period Trs to Tz and the time period corresponding to the time periods Tp and Tq were exchanged, a time interval until the horizontal transfer period after the pixel signal is held in the line memory unit becomes long. In such a case, since a possibility that the electric charges held in the capacitors leak or it is influenced by the disturbance noises increases, a deterioration in quality of the obtained image is considered. Therefore, the driving in which the time interval after the pixel signal is held in the line memory unit and until the horizontal transfer period is shorter, as illustrated in FIG. 8, is desirable.

In the second embodiment, the lengths of the one horizontal synchronization periods before and after the switching of the drive mode are equalized. The time after the horizontal synchronizing signal HD is input to the timing generator 151 and until the reset scan is performed and the time after the horizontal synchronizing signal HD is input to the timing generator 151 and until the pixel signal is held in the capacitors in the line memory unit 131 differ. Therefore, the reset scan can be performed in parallel with the read out scan in the frame F-1.

Third Embodiment

Subsequently, the third embodiment to which the present invention can be applied will be described mainly with respect to a point different from the second embodiment.

Figure 10:
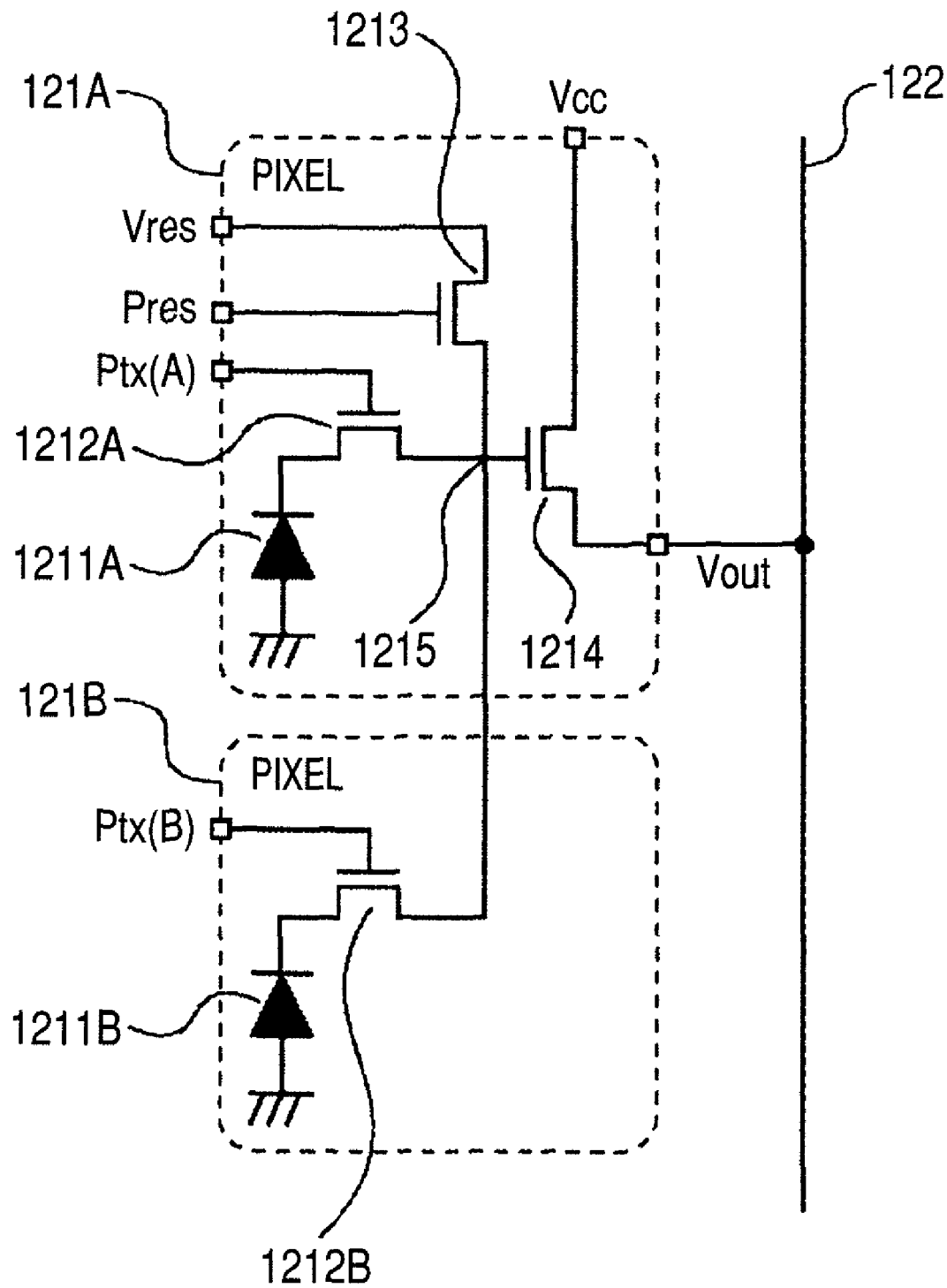
FIG. 10 is a circuit diagram illustrating a constructional example of a pixel of a solid-state imaging apparatus according to the third embodiment of the present invention.
Figure 11:
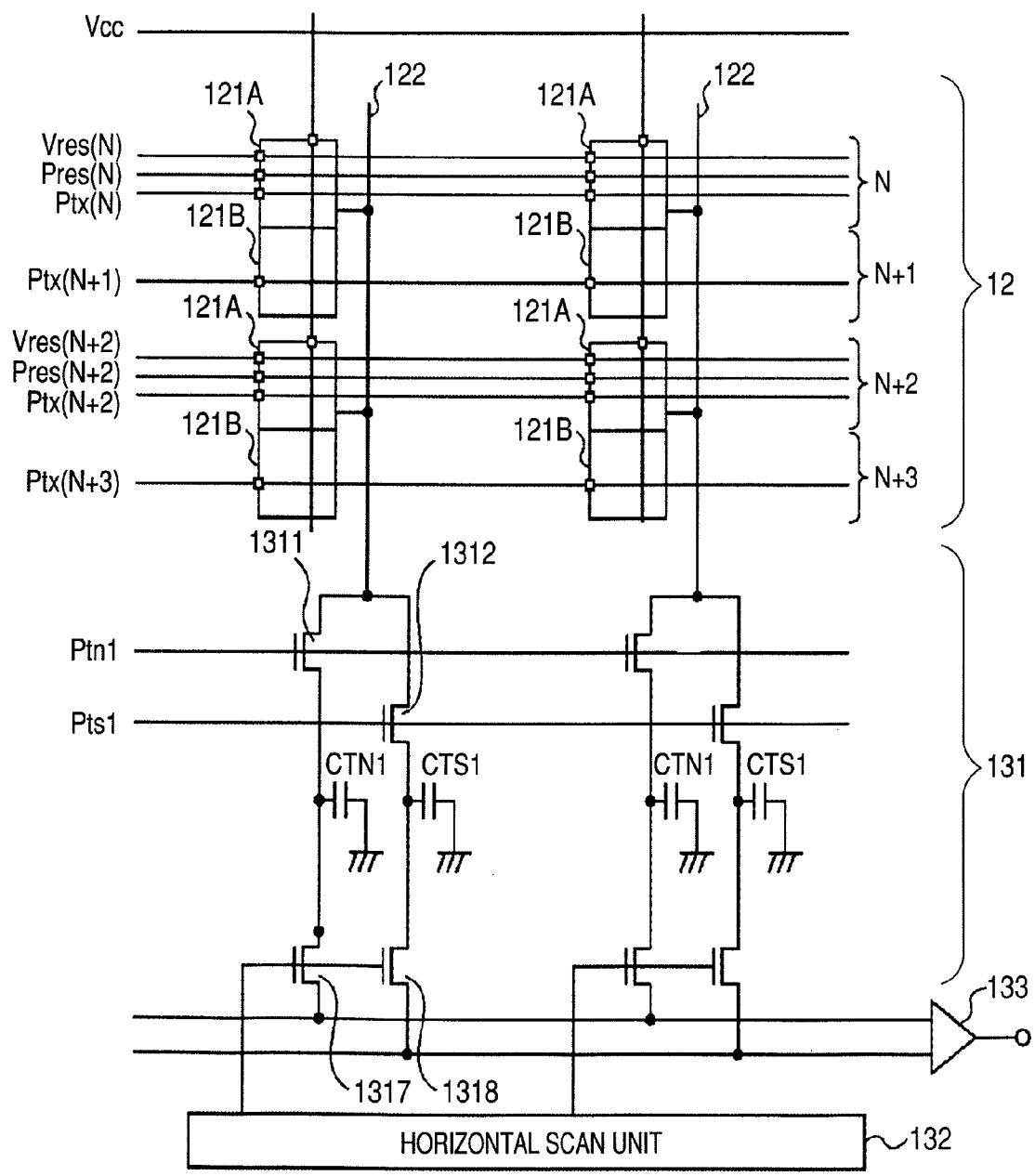
FIG. 11 is a circuit diagram illustrating a constructional example of a pixel region and a line memory unit according to the third embodiment of the present invention.
Figure 13A:
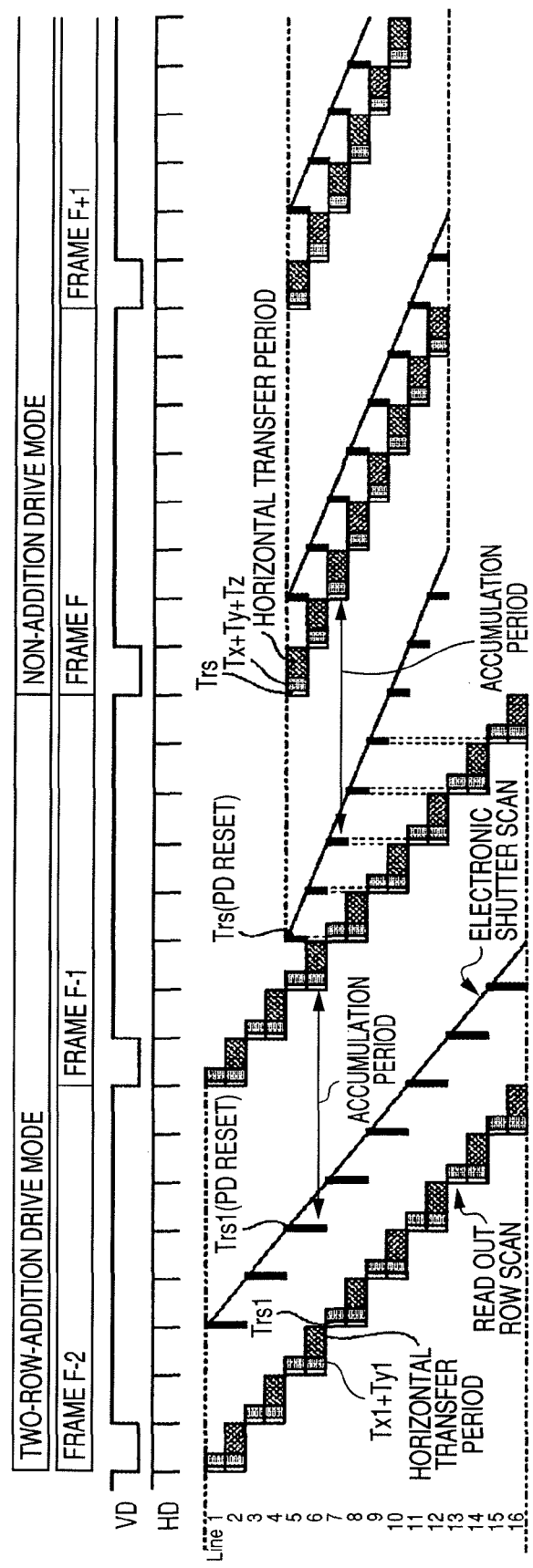
FIGS. 13A and 13B are timing charts showing drive timing for the solid-state imaging apparatus according to the third embodiment of the present invention.
Figure 13B:
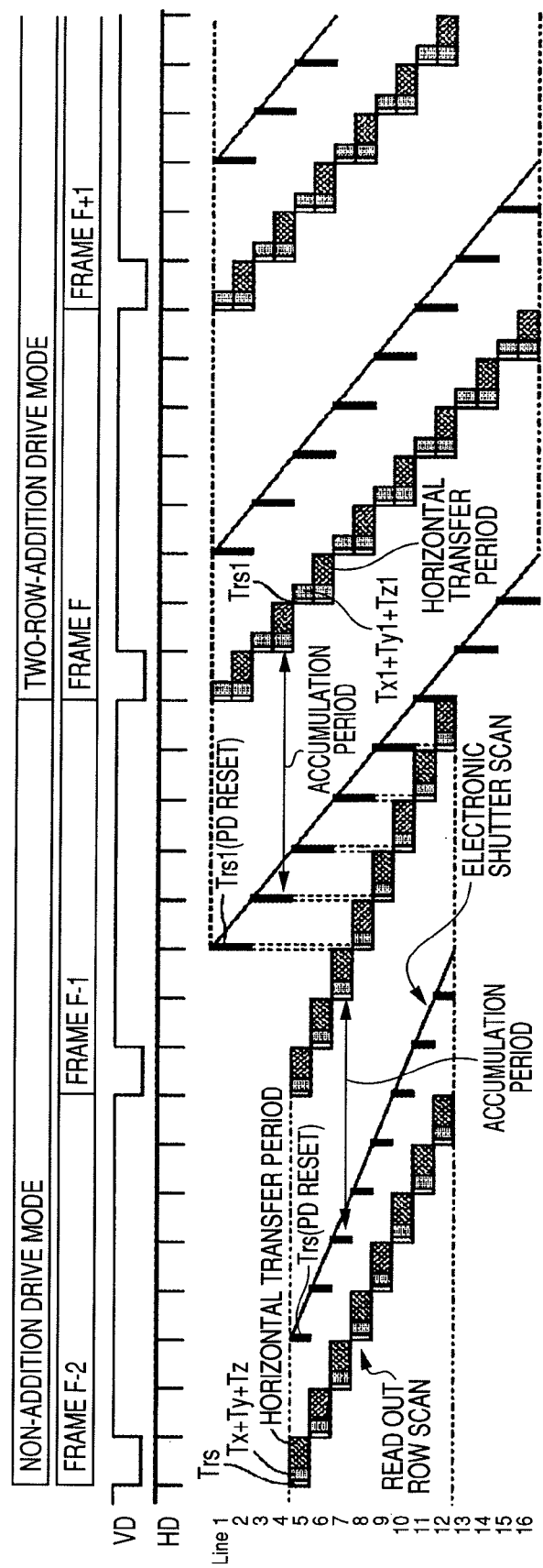

A constructional example of a pixel of the solid-state imaging apparatus 1 according to the third embodiment is illustrated in FIG. 10. A constructional example of the pixel region 12 using the pixel illustrated in FIG. 10 and the line memory unit 131 is illustrated in FIG. 11. A timing chart of the pulses for driving the pixel region 12 and the line memory unit 131 illustrated in FIG. 11 is illustrated in FIGS. 13A and 13B. Constructions common to those in the first and second embodiments are designated by the same reference numerals. Although the pixels of only four rows×two columns are extracted and illustrated here for simplicity of illustration, the number of pixels is not limited to it.

In FIG. 10, the amplifying MOS transistor 1214, reset MOS transistor 1213 and FD region 1215 are shared by pixels 121A and 121B. The FD region 1215 is connected to a PD portion 1211A through a transfer MOS transistor 1212A and is connected to a PD portion 1211B through a transfer MOS transistor 1212B. Although an example in which the amplifying MOS transistor, reset MOS transistor and FD region are shared by the two pixels is illustrated in FIG. 10, the number of pixels which share them is not limited and a construction in which they are shared by three or more pixels may be used. Although the drain of the reset MOS transistor 1213 is connected to the power voltage Vres which can be pulse-driven independently every row, it is also possible to construct in such a manner that it is connected to the power voltage Vcc which is shared by all pixels in a manner similar to the first embodiment.

In FIG. 11, the pixel construction illustrated in FIG. 10, that is, the pixels 121A and 121B are set into one unit and a plurality of units are two-dimensionally arranged in the pixel region 12. The power source line Vres(N) of the Nth row is connected to a Vres terminal of the pixel 121A, the signal line Pres(N) is connected to a Pres terminal, and the signal line Ptx(N) is connected to a Ptx(A) terminal. A signal line Ptx(N+1) of the (N+1)th row is connected to a Ptx(B) terminal of the pixel 121B. In addition to the capacitors CTN1 and CTS1 for storing the signal read out to each vertical output line 122, the line memory unit 131 has the CT transfer switch MOS transistors 1311 and 1312 for connecting the capacitors CTN1 and CTS1 and the vertical output lines 122. The line memory unit 131 further includes the horizontal transfer switch MOS transistors 1317 and 1318 for reading out the signals stored in the capacitors CTN1 and CTS1 to the differential amplifier 133. Although the constructional example in which the addition in the line memory 131 is not executed has been illustrated in FIG. 11, such a construction that the addition is performed in the line memory 131 in a manner similar to the first and second embodiments may be used.

In the constructional example illustrated in FIG. 10, the addition of the pixels which share the FD region can be performed in the FD region in the pixel addition in the column direction.

Figure 12:
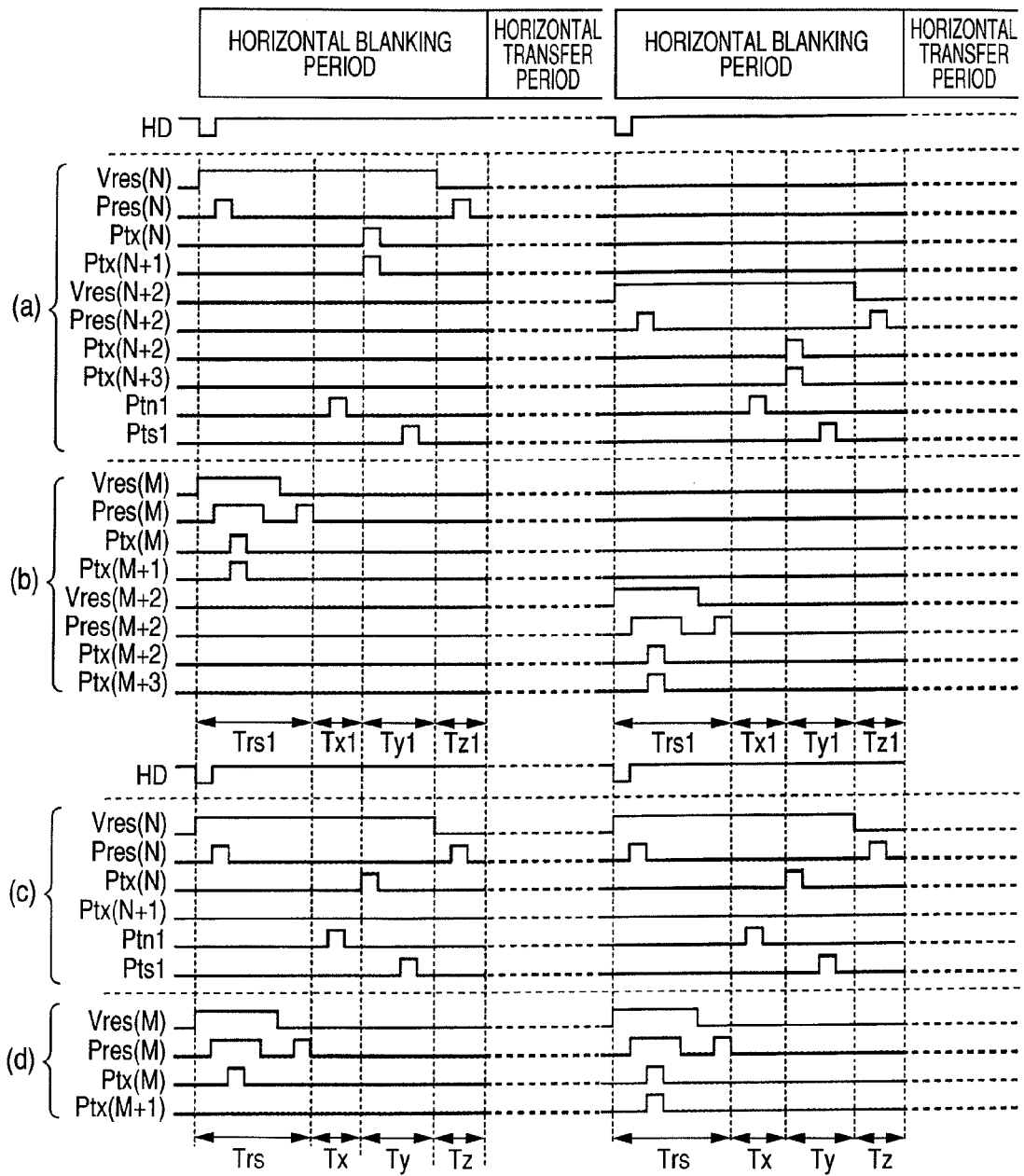
FIG. 12 is a timing chart showing drive timing for the pixel region and the line memory unit according to the third embodiment of the present invention.

Next, the driving method in the third embodiment will be described with reference to a timing chart of FIG. 12.

First, the read out scan and the electronic shutter scan in the two-row-addition drive mode of the Nth and (N+1)th rows and the (N+2)th and (N+3)th rows will be described. (a) in FIG. 12 is the timing chart for the read out operation in the pixel addition drive mode and (b) in FIG. 12 is the timing chart for the electronic shutter operation. When the horizontal synchronizing signal HD is input, the selecting operation of the Nth row and the (N+1)th row is executed by the read out row scan unit 142.

When the reset MOS transistor 1213 is turned on by setting the Pres(N) to the High level after the Vres(N) is set to the High level, the electric potential of the FD region 1215 is initialized to the electric potential according to the electric potential of the power voltage Vres and a state where the Nth row and the (N+1)th row have been selected is obtained. The Vcc as a power source which is common to all pixels 121 of the pixel region 12 may be always held at the High level. At the same time, the PD reset is executed by setting the Ptx(M) and Ptx(M+1) to the High level in the state where the Vres(M) and Pres(M) of the arbitrary Mth and (M+1)th rows have been set to the High level by the electronic shutter scan unit 141. The Mth row and the (M+1)th row are set into the non-selected state by setting the Pres(M) to the High level again after the Vres(M) is set to the Low level. The row selecting operation of the Nth row and the (N+1)th row and the PD reset of the Mth row and the (M+1)th row are completed (time period Trs1).

Subsequently, in the time period Tx1, the pixel signal corresponding to the noise components of the Nth row and the (N+1)th row is read out to the capacitor CTN1.

In the time period Ty1, by simultaneously setting the Ptx(N) and Ptx(N+1) to the High level in a pulse form, the electric charges accumulated in the pixels of the Nth row and the electric charges accumulated in the pixels of the (N+1)th row are transferred to the FD region and added. The pixel signal corresponding to the electric charge amount obtained by multiplexing the electric charges due to the noise components to the electric charges accumulated in the PD portions of the Nth row and the (N+1)th row is held in the capacitor CTS1 and the addition of the Nth row and the (N+1)th row and the read out of the pixel signal are completed.

Subsequently, the Nth row and the (N+1)th row are set into the non-selected state by setting the Pres(N) to the High level again in a state where the Vres(N) has been set to the Low level (time period Tz1).

The horizontal blanking period during which the addition read out of the Nth row and the (N+1)th row and the electronic shutter operation of the Mth row and the (M+1)th row are executed is completed in this manner. Similarly, in the following horizontal blanking period after the elapse of the horizontal transfer period, the addition read out of the (N+2)th row and the (N+3)th row and the electronic shutter operation of the (M+2)th row and the (M+3)th row are executed.

Subsequently, the read out operation and the electronic shutter (PD reset) operation in the non-addition drive mode will be described. (c) in FIG. 12 is the timing chart for the read out operation in the non-addition drive mode and (d) in FIG. 12 is the timing chart for the electronic shutter operation.

First, the row selecting operation is executed by the read out row scan unit 142. Since the FD region is shared by the pixel 121A of the Nth row and the pixel 121B of the (N+1)th row, the Nth row and the (N+1)th row are simultaneously selected. When the reset MOS transistor 1213 is turned on by setting the Pres(N) to the High level after the Vres(N) is set to the High level, the electric potential of the FD region 1215 is initialized to the electric potential according to the electric potential of the power voltage Vres and a state where the Nth row and the (N+1)th row have been selected is obtained. At the same time, the Vres(M), Pres(M) and Ptx(M) of the Mth row are sequentially set to the High level by the electronic shutter scan unit 141 and the PD reset of the Mth row is executed. In this manner, the row selecting operation of the Nth row and the (N+1)th row and the PD reset of the Mth row are completed (time period Trs).

Subsequently, in the time period Tx, the pixel signal corresponding to the noise components of the pixels of the Nth row is read out to the capacitor CTN1.

In the time period Ty, the pixel signal of the Nth row to which the noise components have been multiplexed is read out to the capacitor CTS1 and the read out of the pixel signal of the Nth row is completed. Subsequently, in the time period Tz, the Nth row and the (N+1)th row are set into the non-selected state by setting the Pres(N) to the High level again in the state where the Vres(N) has been set to the Low level. In this manner, the horizontal blanking period during which the read out of the pixel signal of the Nth row and the electronic shutter operation of the Mth row in the non-addition drive mode are executed is completed.

Similarly, in the following horizontal blanking period after the elapse of the horizontal transfer period, the Nth row and the (N+1)th row are selected. At the same time, the PD reset of the (M+1)th row is performed. By setting the Ptx(N+1) to the High level after the noise signal is read out, the pixel signal of the (N+1)th row is read out. After that, the non-selected operation of the Nth row and the (N+1)th row is executed and the horizontal blanking period during which the read out of the (N+1)th row and the electronic shutter operation of the (M+1)th row are executed is completed. The length of the horizontal blanking period in the non-addition drive mode is the same as the horizontal blanking period in the two-row-addition drive mode mentioned above.

FIGS. 13A and 13B are timing charts illustrating a driving method of the solid-state imaging apparatus in the third embodiment. FIG. 13A illustrates the driving method in the case of switching from the two-row-addition drive mode to the non-addition drive mode. FIG. 13B illustrates the driving in the case of switching from the non-addition drive mode as a first drive mode to the two-row-addition drive mode as a second drive mode. In FIG. 13A, in the frame F-1 as a frame just before the switching of the drive mode, the read out row scan in the two-row-addition drive mode and the electronic shutter operation in the non-addition drive mode are executed in parallel. At this time, the PD reset time period Trs in the non-addition drive mode is overlapped with the time period Trs1 in the two-row-addition drive mode.

In FIG. 13B, in the frame F-1 as a first frame which is a frame just before the drive mode is switched, the read out row scan in the non-addition drive mode as a first drive mode is executed. Further, in the frame F-1, the electronic shutter operation in the two-row-addition drive mode as a second drive mode is executed in parallel. At this time, the PD reset time period Trs1 in the two-row-addition drive mode are overlapped with the time period Trs in the non-addition drive mode, respectively.

According to the third embodiment, even if the read out scan and the electronic shutter scan in the different drive modes are executed in the frame just before the switching of the drive mode, the PD reset time period in the electronic shutter scan is not overlapped with the signal read out time period from the vertical output lines in the read out row scan. Therefore, even in the solid-state imaging apparatus having such a construction that the pixel addition can be performed in the FD region, the reset row scan of the following frame can be started during the read out row scan in the frame just before the switching of the drive mode. That is, even when the frame rate is raised, the accumulation time of the frame just after the switching of the drive mode can be extended and the deterioration in picture quality in the electronic zooming mode can be prevented. Further, in the third embodiment, since the selecting operation and the PD reset are executed in the same time period, it is unnecessary to provide the time period only for the PD reset such as time periods Tr1 and Tr2 in the first embodiment. Thus, the horizontal blanking period can be shortened.

Although the third embodiment has been described with respect to the example in which the two-row-addition drive mode and the non-addition drive mode are used as drive modes in a manner similar to the description of the first and second embodiments of the present invention, the number of rows to be added for the one horizontal blanking period is not limited. Although the example in which the signals of the pixels are added by using the capacitors of the line memory has been shown above, it does not limit the embodiment of the present invention. For example, the outputs from the vertical output lines may be connected to the line memory through the noise cancelling circuit and the addition may be performed in the noise cancelling circuit. Further, the present invention can be also applied to such a scan that the rows are skipped within the one horizontal blanking period, that is, to the case where the pixels are thinned out and the signals are read out of a partial region in the pixel region. That is, by making the horizontal blanking periods constant in the different drive modes and by further executing the PD reset for a time period during which the read out of the signals from the vertical output lines is not executed, an effect similar to that in the third embodiment can be obtained. In the solid-state imaging apparatus which comprises light-shielded pixels for a correcting process and pixels which do not have the photoelectric conversion elements are held in the pixel region along with the effective pixels regarding the creation of the image, the partial region in the pixel region can also indicate the whole of the effective pixels.

In the third embodiment, the lengths of the one horizontal synchronization periods before and after the switching of the drive mode are equalized. The time after the horizontal synchronizing signal HD is input to the timing generator 151 and until the reset scan is performed and the time after the horizontal synchronizing signal HD is input to the timing generator 151 and until the pixel signal is held in the capacitors in the line memory unit 131 differ. Therefore, the reset scan can be performed in parallel with the read out scan in the frame F-1.

Fourth Embodiment

Figure 14:
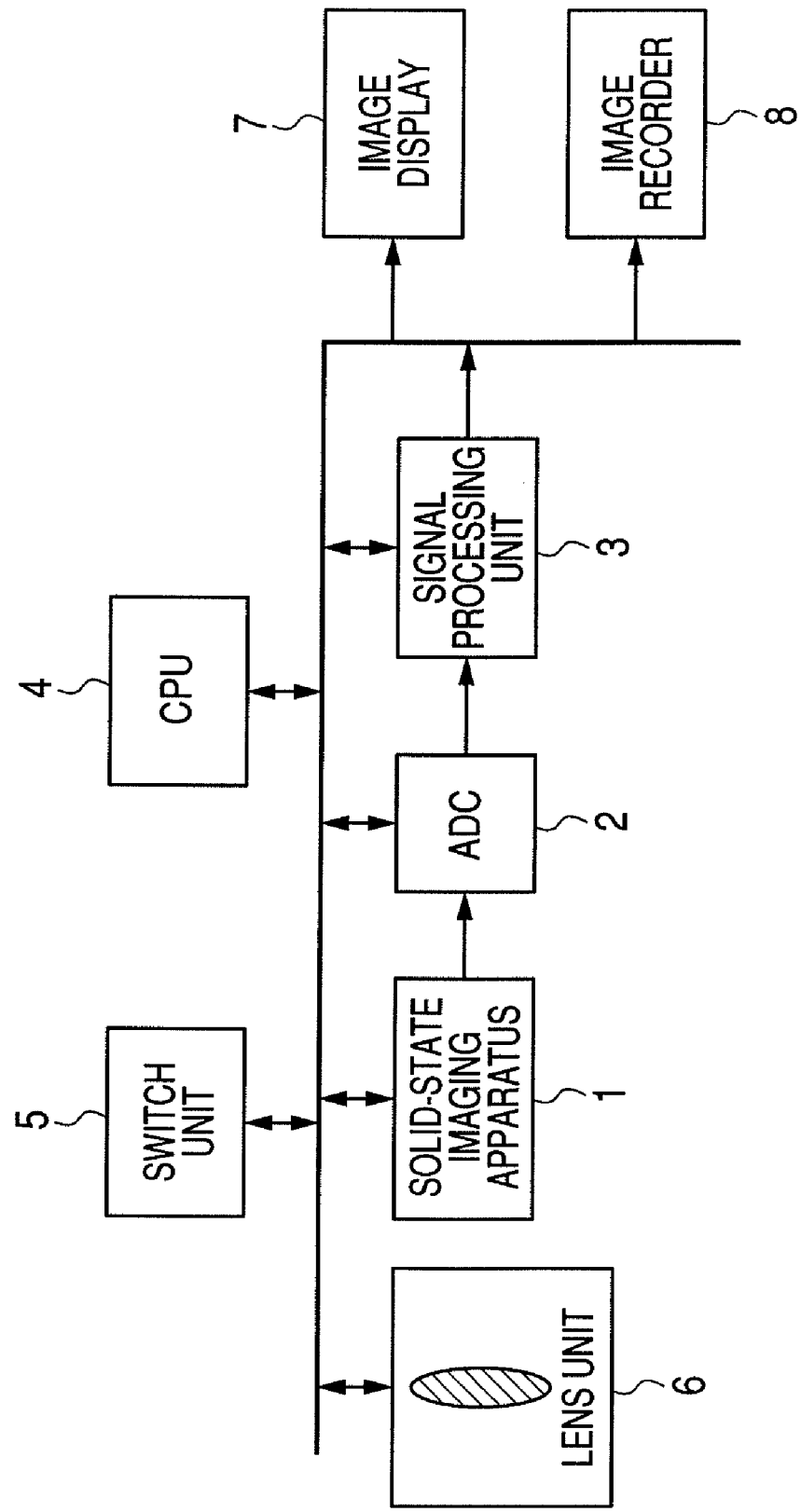
FIG. 14 is a block diagram illustrating a constructional example of an imaging system according to the fourth embodiment of the present invention.

Subsequently, the fourth embodiment to which the present invention can be applied will now be described. FIG. 14 illustrates a constructional example of a solid-state imaging apparatus according to the fourth embodiment. In FIG. 14, there are provided: the solid-state imaging apparatus 1 illustrated in FIG. 1; an A/D converter (ADC) 2; a signal processing unit 3; a CPU 4; a switch unit 5; a lens unit 6 as an optical system to form an image in the pixel region 12; an image display 7; and an image recorder 8. The solid-state imaging apparatus 1 is an apparatus as described in the first to third embodiments.

The solid-state imaging apparatus 1 executes a photoelectric conversion according to a light beam which has entered the lens unit 6 and outputs an image signal. The image signal as an analog signal output from the solid-state imaging apparatus 1 is converted into a digital signal in the ADC 2 and output as image data. In the signal processing unit 3, a signal process such as an image correction or the like is executed to the image data. The image data processed in the signal processing unit 3 is displayed by the image display 7 or recorded by the image recorder 8. When a control signal for a mode change, electronic zoom, or the like is input to the CPU 4 by the operation of the switch unit 5, the CPU 4 changes control of the lens unit 6, solid-state imaging apparatus 1, ADC 2, signal processing unit 3, image display 7 and image recorder 8.

According to the fourth embodiment of the present invention, upon switching of the electronic zoom in a motion image photographing mode of the high frame rate, the deterioration in the image just after a zoom magnification is switched can be prevented.

Further, in the driving method of the solid-state imaging apparatus 1, since the horizontal blanking period is constant irrespective of the electronic zoom magnification, that is, the drive mode, a time until the output of the image signal is started after the horizontal synchronizing signal is input becomes constant. Thus, such an effect that the control of the ADC 2 and the signal processing unit 3 when the electronic zoom magnification is changed can be simplified can be obtained.

(Others)

In each of the foregoing embodiments, the construction in which the pixel signals output to the vertical output lines 122 are directly input to the line memory unit 131 as a holding unit has been illustrated in FIG. 1 and the like. However, the construction of the holding unit is not limited to that illustrated as an example, and for example, a clamp capacitor serially inserted to the path between the pixel region 12 and the amplifier 133 for each vertical output line 122 may be used. Further, another amplifier may be provided between each clamp capacitor and the amplifier 133.

In each of the foregoing embodiments, the scan in which the rows are skipped, that is, the drive mode in which the pixels are thinned out and the pixel signals are read out of a partial region in the pixel region, the drive mode in which the pixel signals are read out of all pixels in the partial region in the pixel region, and the drive mode in which the pixel signals are added have been mentioned.

In each of the foregoing embodiments, in the electronic shutter scan which is started in the frame F-1 as a first frame, the PD reset is executed to the pixels to which the read out scan is executed in the frame F as a second frame. With respect to the pixels to which the read out scan is not executed in the frame F, it is unnecessary to execute the PD reset.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-026541, filed Feb. 6, 2008, which is hereby incorporated by reference herein in its entirety.

The invention claimed is:

1. A driving method of a solid-state imaging apparatus that includes: a pixel region with pixels arranged two dimensionally, wherein each of the pixels includes a photoelectric conversion element for accumulating an electric charge according to an incident light, a floating diffusion region for holding the electric charge, a transfer unit for transferring the electric charge accumulated in the photoelectric conversion element to the floating diffusion region, a reset unit for resetting the electric charge held in the floating diffusion region, and an output unit for outputting a pixel signal according to a voltage in the floating diffusion region; and a holding unit for holding the pixel signals output from the output units, the method comprising steps of:

conducting, in a first frame, a read out scan in a first drive mode, for selecting a pixel by controlling a potential of the floating diffusion region of the pixel by a power source unit and the reset unit, and holding the pixel signal of the pixel in the holding unit; and commencing, in a second frame following the first frame, a read out scan in a second drive mode different from the first drive mode, and conducting a reset scan in the second drive mode, for resetting the electric charge accumulated in the photoelectric conversion element of the pixel, wherein the reset scan starts in the first frame in which the read out scan in the first drive mode is conducted, and is conducted without overlapping with a holding operation of holding the pixel signal in the holding unit within a horizontal synchronization period.

2. The driving method of a solid-state imaging apparatus according to claim 1, wherein a length of one horizontal synchronization period in the first drive mode and a length of one horizontal synchronization period in the second drive mode are the same length, and a length of a period from a start of the horizontal synchronization period to the holding operation and a length of a period from the start of the horizontal synchronization period to a resetting operation are different.

3. The driving method of a solid-state imaging apparatus according to claim 1, wherein a length of one horizontal blanking period in the first drive mode and a length of one horizontal blanking period in the second drive mode are a same length.

4. The driving method of a solid-state imaging apparatus according to claim 1, wherein the electric charge, which is accumulated in the photoelectric conversion element of the pixel outputting the pixel signal and held in the holding unit by the read out scan in the second drive mode in the second frame, is reset by the reset scan starting in the second drive mode in the first frame.

5. The driving method of a solid-state imaging apparatus according to claim 1, wherein a resetting operation for resetting the electric charge accumulated in the photoelectric conversion element in the reset scan in the second drive mode is conducted in a same time period as a selecting operation for selecting the pixel subjected to the read out scan in the first drive mode.

6. A solid-state imaging apparatus comprising:

a pixel region with pixels arranged two dimensionally, wherein each pixel includes: a photoelectric conversion element for accumulating an electric charge according to an incident light, a floating diffusion region for holding the electric charge, a transfer unit for transferring the electric charge accumulated in the photoelectric conversion element to the floating diffusion region, a reset unit for resetting the electric charge held in the floating diffusion region, and an output unit for outputting a pixel signal according to a voltage in the floating diffusion region; and a holding unit for holding the pixel signals output from the output units;

wherein, in a first frame, a read out scan is conducted in a first drive mode, for selecting a pixel by controlling a potential of the floating diffusion region of the pixel by a power source unit and the reset unit of the pixel, and holding the pixel signal of the pixel in the holding unit, wherein, in a second frame following the first frame, a read out scan is commenced in a second drive mode different from the first drive mode, and wherein a reset scan is conducted in the second drive mode, for resetting the electric charge accumulated in the photoelectric conversion element, such that the reset scan starts in the first frame in which the read out scan in the first drive mode is conducted, and is conducted without overlapping with a holding operation of the pixel signal in the holding unit within a horizontal synchronization period.

7. The solid-state imaging apparatus according to claim 6, further comprising a controller that controls a length of one horizontal synchronization period in the first drive mode and a length of one horizontal synchronization period in the second drive mode to be a same length, and controls a length of a period from a start of the horizontal synchronization period to the holding operation and a length of a period from the start of the horizontal synchronization period to a resetting operation are different.

8. The solid-state imaging apparatus according to claim 6, wherein a length of one horizontal blanking period in the first drive mode and a length of one horizontal blanking period in the second drive mode are a same length.

9. The solid-state imaging apparatus according to claim 6, wherein the electric charge, which is accumulated in the photoelectric conversion element of the pixel outputting the pixel signal and held in the holding unit by the read out scan in the second drive mode in the second frame, is reset by the reset scan starting in the second drive mode in the first frame.

10. The solid-state imaging apparatus according to claim 6, further comprising a controller that controls such that a resetting operation for resetting the electric charge accumulated in the photoelectric conversion element in the reset scan in the second drive mode is conducted in a same time period as a selecting operation for selecting the pixel subjected to the read out scan in the first drive mode.

11. The solid-state imaging apparatus according to claim 6, wherein each of the plurality of the photoelectric conversion elements is connected to a respective one of the floating diffusion regions, via a respective transfer unit.

12. The solid-state imaging apparatus according to claim 6, wherein, for each pixel the photoelectric conversion element is a photodiode, each of the transfer unit, the reset unit, and the output unit is a MOS transistor, and the floating diffusion region is connected to a gate of the MOS transistor of the output unit as an output portion.

13. A solid-state imaging apparatus according to claim 6, wherein the solid-state imaging apparatus is incorporated in an imaging system that includes:
   an optical system for forming an image on the pixel region; and
   a signal processing unit for processing a signal output from the solid-state imaging apparatus.

14. The solid-state imaging apparatus according to claim 6, wherein the reset scan in the second drive mode is conducted in a period after setting a non-selecting state for read scanning, until selection of a pixel of a next row.

* * * * *